(12) United States Patent
Fukuda et al.

(10) Patent No.: US 10,967,327 B2
(45) Date of Patent: Apr. 6, 2021

(54) SPRAY DRYING SYSTEM

(71) Applicant: Mitsubishi Hitachi Power Systems, Ltd., Yokohama (JP)

(72) Inventors: Toshihiro Fukuda, Yokohama (JP); Satoru Sugita, Yokohama (JP); Tetsu Ushiku, Yokohama (JP); Seiji Kagawa, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/319,939

(22) PCT Filed: Oct. 11, 2017

(86) PCT No.: PCT/JP2017/036835
§ 371 (c)(1),
(2) Date: Jan. 23, 2019

(87) PCT Pub. No.: WO2018/088097
PCT Pub. Date: May 17, 2018

(65) Prior Publication Data
US 2019/0270049 A1    Sep. 5, 2019

(30) Foreign Application Priority Data
Nov. 14, 2016    (JP) .............................. JP2016-221873

(51) Int. Cl.
*B01D 53/78*    (2006.01)
*C02F 1/12*    (2006.01)
(Continued)

(52) U.S. Cl.
CPC ............ *B01D 53/78* (2013.01); *B01D 53/50* (2013.01); *B01D 53/75* (2013.01); *C02F 1/12* (2013.01);
(Continued)

(58) Field of Classification Search
CPC .... B01D 1/16–18; B01D 53/50; B01D 53/75; B01D 53/78; C02F 1/12; C02F 2101/101; C02F 2103/34
See application file for complete search history.

(56) References Cited

U.S. PATENT DOCUMENTS

| 4,610,849 A | 9/1986 | Van Camp et al. |
| 2010/0319538 A1 | 12/2010 | Ahman et al. |

(Continued)

FOREIGN PATENT DOCUMENTS

| CN | 101417826 A | 4/2009 |
| CN | 103547355 A | 1/2014 |

(Continued)

OTHER PUBLICATIONS

Office Action dated Oct. 29, 2019, issued in counterpart JP Application No. 2016-221837, with English translation. (10 pages).

(Continued)

*Primary Examiner* — Renee Robinson
(74) *Attorney, Agent, or Firm* — Westerman, Hattori, Daniels & Adrian, LLP

(57) ABSTRACT

A spray drying system for drying wastewater to be dried includes: an exhaust as introduction line for introducing the exhaust gas discharged from an exhaust gas generation source, the exhaust gas introduction line being connected to a plurality of exhaust gas ducts for allowing the exhaust gas to flow through; and at least one spray drying device connected to the exhaust gas introduction line and configured to bring the exhaust gas introduced from the exhaust gas introduction line into contact with the wastewater. The number of spray drying device is smaller than the number of the plurality of exhaust gas ducts.

10 Claims, 13 Drawing Sheets

(51) Int. Cl.
  *B01D 53/50* (2006.01)
  *B01D 53/75* (2006.01)
  *F23J 15/04* (2006.01)
  *C02F 101/10* (2006.01)
(52) U.S. Cl.
  CPC ......... *F23J 15/04* (2013.01); *C02F 2101/101* (2013.01); *F23J 2215/20* (2013.01)

(56) References Cited

U.S. PATENT DOCUMENTS

| | | | |
|---|---|---|---|
| 2012/0240761 | A1 | 9/2012 | Ukai et al. |
| 2014/0045131 | A1* | 2/2014 | Fukuda .................. C02F 1/048 432/72 |
| 2014/0083629 | A1 | 3/2014 | Fukuda et al. |
| 2015/0360174 | A1 | 12/2015 | Fukuda et al. |
| 2017/0225121 | A1 | 8/2017 | Fukuda et al. |
| 2017/0233263 | A1* | 8/2017 | Kokkinos ................ B01D 1/14 210/661 |

FOREIGN PATENT DOCUMENTS

| | | |
|---|---|---|
| EP | 2716349 A1 | 4/2014 |
| EP | 2949376 A1 | 12/2015 |
| EP | 2959959 A1 | 12/2015 |
| JP | 50-62871 A | 5/1975 |
| JP | 2000-84353 A | 3/2000 |
| JP | 2000-271422 A | 10/2000 |
| JP | 2001-179047 A | 7/2001 |
| JP | 2011-512251 A | 4/2011 |
| JP | 2012-196638 A | 10/2012 |
| JP | 2014-161799 A | 9/2014 |

OTHER PUBLICATIONS

First Examination Report dated Jan. 1, 2020, issued in counerrpart IN Application No. 201917002698, with English translation (5 pages).

International Search Report dated Dec. 19, 2017, issued in counterpart International Application No. PCT/JP2017/036835. (12 pages).

Notification Concerning Transmittal of International Preliminary Report on Patentability (Form PCT/IN/326) issued in counterpart International Application No. PCT/JP2017/036835 dated May 23, 2019, with Forms PCT/IB/373 and PCT/ISA/237; with English translation. (9 pages).

Extended (Supplementary) European Search Report dated Apr. 21, 2020, issued in counterpart EP Application No. 17868789.3. (5 pages).

Office Action dated Sep. 18, 2020, issued in counterpart CN Application No. 201780002497.2, with English Translation. (17 pages).

* cited by examiner

SPRAY DRYING SYSTEM

TECHNICAL FIELD

The present disclosure relates to a drying device configured to dry wastewater generated from processing exhaust gas discharged from an exhaust gas generation source such as a boiler.

BACKGROUND ART

Exhaust gas discharged from a boiler (exhaust gas generation source) installed in a thermal power plant or the like is purified via processing by an exhaust gas treatment system, and then discharged to the atmosphere (outside). This type of exhaust gas treatment system includes a plurality of types of facilities, such as a denitration device that removes nitrogen oxide from exhaust gas, an air heater that recovers heat of exhaust gas having passed through the denitration device, a dust collector that removes soot dust from exhaust gas after heat recovery, and a desulfurization system that removes sulfur oxide from exhaust gas after dust removal. These various facilities are disposed in a flue gas duct connected to a boiler in series. Meanwhile, some known exhaust gas treatment systems have only a single system of the flue gas duct where the various facilities are disposed in series as described in Patent Document 1, or some known exhaust gas treatment systems include two systems of the flue gas ducts arranged in parallel to each other, each including a denitration device, an air heater, a gas-gas heater, an electric precipitator, and an induced draft fan disposed in series, as described in Patent Document 2.

Furthermore, as the above described desulfurization system, normally used is a wet-type desulfurization system that removes sulfur oxide from exhaust gas through gas-liquid contact between an absorption liquid and exhaust gas. Wastewater discharged from the desulfurization system (hereinafter, "desulfurization wastewater") may contain ions such as chlorine ion and ammonium ion, mercury, boron, selenium, etc. In recent years, environmental standards for plant wastewater including desulfurization wastewater are becoming stricter to reduce the effects on environment. For example, US Effluent Limitation Guidelines (ELG) and the like have strengthened the wastewater regulation standards. Thus, to meet such environmental standards, some substances which may have impact on environment are removed from desulfurization wastewater by using a wastewater processing facility, before discharging the desulfurization wastewater outside the system. However, in a case where wastewater is processed through a wastewater processing facility, not only the cost of the facility itself, but the costs related to operation of the facility (electricity, chemicals, etc.) may increase relatively. Under this situation, exhaust gas processing facilities that do not discharge desulfurization wastewater outside the system and discharge no wastewater are becoming more important.

For instance, in Patent Document 1, a spray drying device that sprays and gasifies desulfurization wastewater is used to prevent desulfurization wastewater from being discharged as wastewater. Specifically, desulfurization wastewater from the desulfurization system and a part of exhaust gas flowing through the flue gas duct are both supplied to the spray drying device, and the spray drying device dries the desulfurization wastewater with high-temperature exhaust gas inside the device (evaporate the liquid component), so as not to discharge the desulfurization wastewater outside the system, thus discharging no wastewater. By drying desulfurization wastewater, calcium chloride contained in the desulfurization wastewater, for instance, is precipitated inside the device. Further, exhaust gas used in the process by the spray drying device is returned again to the flue gas duct, and thereby purified by the exhaust gas treatment system.

CITATION LIST

Patent Literature

Patent Document 1: JP2014-161799A
Patent Document 2: JP2000-84353A

SUMMARY

Problems to be Solved

For instance, an exhaust gas treatment system of a thermal power plant includes a plurality of (normally two or three) flue gas ducts (exhaust gas ducts) including a device for processing exhaust gas. If the spray drying system disclosed in Patent Document 1 is applied to such an exhaust gas treatment system, one spray drying device needs to be provided for each of the flue gas ducts (number of flue gas ducts=number of spray drying devices). However, excessive equipment may reduce the operation rate of each spray drying device unnecessarily, and also increase the maintenance costs.

In view of the above, an object of at least one embodiment of the present invention is to provide a spray drying system which can be applied to an exhaust gas treatment system having a plurality of flue gas ducts (exhaust gas ducts), which is low-cost and easy to handle, and which has a high installability and a high maintainability.

Solution to the Problems (1) According to at least one embodiment of the present invention, a spray drying system for drying wastewater to be dried includes: an exhaust gas introduction line for introducing the exhaust gas discharged from an exhaust gas generation source, the exhaust gas introduction line being connected to a plurality of exhaust gas ducts for allowing the exhaust gas to flow through; and at least one spray drying device connected to the exhaust gas introduction line and configured to bring the exhaust gas introduced from the exhaust gas introduction line into contact with the wastewater. The number of spray drying device is smaller than the number of the plurality of exhaust gas ducts.

With the above configuration (1), the spray drying system includes fewer spray drying devices than the exhaust gas ducts. For example, in a case where the exhaust gas ducts include two systems, i.e. A-system and B-system, the spray drying system includes one spray drying device. As described above, with the spray drying device being shared by a plurality of exhaust gas ducts, it is possible to provide a spray drying system which is low-cost and easy to handle, and which has a high installability and a high maintainability.

(2) In some embodiments, in the above configuration (1), the exhaust gas introduction line is connected to each of the plurality of exhaust gas ducts.

With the above configuration (2), it is possible to extract (branch) exhaust gas uniformly from each of the plurality of exhaust gas ducts.

(3) In some embodiments, in the above configuration (2), the exhaust gas introduction line includes: an upstream-side exhaust gas introduction line connected to each of the plurality of exhaust gas ducts; an introduction-side merge part at which each of the upstream-side exhaust gas introduction line merges; and a single downstream-side exhaust gas introduction line connecting the introduction-side merge part and the spray drying device.

With the above configuration (3), exhaust gas from each of the plurality of exhaust gas ducts merges at the introduction-side merge part, and then is supplied to the spray drying device through the single downstream-side exhaust gas introduction line. Thus, with the exhaust gas introduction line and the spray drying device being connected at one location, it is possible to simplify the configuration of the spray drying device. Additionally, in a case where the spray drying device includes a plurality of spray devices such as a two-fluid atomizing nozzle and a rotary atomizer in order to increase the gas-liquid contact area between exhaust gas and wastewater, it is possible to supply exhaust gas evenly to each of the plurality of spray devices.

(4) In some embodiments, in the above configuration (2) or (3), a heat exchanger configured to exchange heat with the exhaust gas is disposed in each of the plurality of exhaust gas ducts, and each of the exhaust gas introduction line is connected to corresponding one of the plurality of exhaust gas ducts on an upstream side of the heat exchanger.

With the above configuration (4), it is possible to supply the spray drying device with the higher-temperature exhaust gas before passing through the heat exchanger via the exhaust gas introduction line. Accordingly, in the spray drying device, it is possible to cause the higher-temperature exhaust gas to contact the wastewater, and thus it is possible to improve the efficiency of the wastewater processing by the spray drying device.

(5) In some embodiments, in any one of the above configurations (1) to (4), the spray drying system further includes an exhaust gas discharge line connecting the spray drying device and each of the plurality of exhaust gas ducts. The exhaust gas discharge line includes: a single upstream-side exhaust gas discharge line connected to the spray drying device; a downstream-side exhaust gas discharge line connected to each of the plurality of exhaust gas ducts; and a discharge-side branch part branched into each of the downstream-side exhaust gas discharge line from the single upstream-side exhaust gas discharge line.

With the above configuration (5), the exhaust gas extracted from each of the plurality of exhaust gas ducts is returned evenly to each of the plurality of exhaust gas ducts via the exhaust gas discharge line after passing through the spray drying device. Accordingly, it is possible to equalize the flow rate of exhaust gas flowing through each of the plurality of exhaust gas ducts, and equalize the processing load of various devices for processing exhaust gas (e.g. the first dust collector and the induced draft fan described below) disposed in each of the plurality of exhaust gas ducts.

(6) In some embodiments, in the above configuration (5), a first dust collector configured to remove soot dust contained in the exhaust gas is disposed in each of the plurality of exhaust gas ducts, and each of the plurality of downstream-side exhaust gas discharge lines of the exhaust gas discharge line is connected to corresponding one of the plurality of exhaust gas ducts on an upstream side of the corresponding first dust collector.

With the above configuration (6), in the spray drying system in which the first dust collector is disposed in each of the plurality of exhaust gas ducts, the first dust collector disposed in each of the plurality of exhaust gas ducts can be used to process exhaust gas returned from the spray drying device. Thus, it is possible to avoid additional provision of a dust collector for removing dry solid substances and soot dust contained in exhaust gas discharged from the spray drying device, and thereby it is possible to suppress the facility costs.

(7) In some embodiments, in the above configuration (5) or (6), the spray drying system further includes a second dust collector disposed in the upstream-side exhaust gas discharge line of the exhaust gas discharge line and configured to remove soot dust contained in the exhaust gas.

With the above configuration (7), the second dust collector is provided as a facility dedicated to removal of soot dust contained in exhaust gas discharged from the spray drying device. Accordingly, in the exhaust gas treatment system in which the first dust collector is disposed in each of the plurality of exhaust gas ducts, the first dust collector disposed in each of the plurality of exhaust gas ducts does not need to remove dust from exhaust gas returned from the spray drying device, and it is possible to suppress the processing load of the first dust collector. Furthermore, in a case where the induced draft fan (induced draft blower) is disposed in each of the plurality of exhaust gas ducts, in a case where the downstream-side exhaust gas discharge line is connected to the exhaust gas duct downstream of the induced draft fan, it is possible to reduce the flow rate of the exhaust gas flowing the upstream side of the induced draft fan of the exhaust gas duct, and it is possible to reduce the load of the induced draft fan disposed in each of the plurality of exhaust gas ducts.

(8) In some embodiments, in any one of the above configurations (5) to (7), a connection position between the spray drying device and the upstream-side exhaust gas discharge line is positioned above a connection position between each of the respective downstream-side exhaust gas discharge lines and corresponding one of the plurality of exhaust gas ducts.

With the above configuration (8), dry solid substances and soot dust contained in exhaust gas can pass through the exhaust gas discharge line while falling freely. Accordingly, it is possible to prevent clogging of the exhaust gas discharge line due to dry solid substances and soot dust, and simplify the duct route by shortening the duct length for carrying dry solid substances and soot dust via the exhaust gas discharge line.

(9) In some embodiments, in the above configuration (8), the upstream-side exhaust gas discharge line is connected to a bottom part of the spray drying device, a position of the discharge-side branch part is positioned below the connection position between the spray drying device and the upstream-side exhaust gas discharge line, and above the connection position between each of the plurality of downstream-side exhaust gas discharge lines and corresponding one of the plurality of exhaust gas ducts, and the position of the discharge-side branch part is positioned in the middle of two exhaust gas ducts disposed outermost of the plurality of exhaust gas ducts.

With the above configuration (9), it is possible to distribute exhaust gas evenly to the plurality of downstream-side exhaust gas discharge lines while suppressing clogging of the exhaust gas discharge line due to dry solid substances and soot dust that fall through the exhaust gas discharge line freely

(10) In some embodiments, in any one of the above configurations (1) to (9), the spray drying device is positioned in a space between the plurality of exhaust gas ducts in a planar view.

With the above configuration (10), it is possible to shorten the distance between the spray drying device and the plurality of exhaust gas ducts, shorten the entire length of the exhaust gas discharge line further, and suppress the production costs and maintenance costs.

(11) In some embodiments, in any one of the above configurations (1) to (4), a bottom part of the spray drying device is connected directly to an upper part of each of the plurality of exhaust gas ducts.

With the above configuration (11), it is possible to save the space in the spray drying system, and it is no longer necessary to provide the exhaust gas discharge line.

(12) In some embodiments, in any one of the above configurations (1) to (11), the spray drying device includes a rotary atomizer capable of spraying the wastewater so as to form a swirl flow of the wastewater.

With the above configuration (12), the wastewater is sprayed by the rotary atomizer, and thereby it is possible to increase the contact area between the exhaust gas and the wastewater, and improve the processing efficiency of the spray drying device.

(13) In some embodiments, in any one of the above configurations (1) to (11), the spray drying device includes a two-fluid atomizing nozzle capable of spraying the wastewater.

With the above configuration (13), the wastewater is sprayed by the two-fluid atomizing nozzle, and thereby it is possible to increase the contact area between the exhaust gas and the wastewater, and improve the processing efficiency of the spray drying device.

(14) In some embodiments, in the above configuration (3), the spray drying system further includes: a first flow-rate adjusting part disposed in the downstream-side exhaust gas introduction line; and a second flow-rate adjusting part disposed in each of the plurality of upstream-side exhaust gas introduction lines.

With the above configuration (14), with the first flow-rate adjusting part, which is a damper for instance, disposed in the downstream-side exhaust gas introduction line (i.e. on the downstream side of the introduction-side merge part), it is possible to supply or stop supply of exhaust gas to the spray drying device from the exhaust gas introduction line easily, and perform maintenance on the spray drying device easily. Further, if the second flow-rate adjusting part is not disposed in each of the plurality of upstream-side exhaust gas introduction lines of the spray drying system, when the first flow-rate adjusting part disposed in the downstream-side exhaust gas introduction line is closed during operation of the exhaust gas treatment system, exhaust gas G would reach the first flow-rate adjusting part, and accumulate in the exhaust gas introduction line. Further, when the temperature of exhaust gas decreases in this accumulation state, $SO_2$ contained in exhaust gas would elute out, and cause erosion or the like of the exhaust gas introduction line. However, by closing the first flow-rate adjusting part after closing the second flow-rate adjusting part, it is possible to avoid accumulation of exhaust gas in the exhaust gas introduction line, and prevent the accumulating exhaust gas G from damaging the exhaust gas introduction line.

(15) In some embodiments, in the above configuration (14), the spray drying system further includes: an exhaust gas discharge line connecting the spray drying device and the plurality of exhaust gas ducts; a temperature detection unit disposed in a bottom part of the spray drying device or the exhaust gas discharge line; and a control device configured to control the first flow-rate adjusting part so that a temperature detected by the temperature detection unit is not lower than an evaporation temperature of the wastewater.

With the above configuration (15), the temperature detection unit is disposed in the vicinity of the outlet through which exhaust gas from the spray drying device is discharged. The control device controls the first flow-rate adjusting part (e.g. damper) so that the detection temperature obtained by the temperature detection unit is not lower than the evaporation temperature of the wastewater, and thereby controls the flow rate of high-temperature exhaust gas supplied to the spray drying device. That is, since the temperature detection unit is disposed in the vicinity of the outlet of the spray drying device, if the detection temperature is higher than the evaporation temperature of the wastewater, it can be estimated that the evaporation process of the wastewater by the spray drying device is properly carried out. Further, the flow rate of exhaust gas supplied to the spray drying device increases with an increase of the opening degree of the first flow-rate adjusting part, and decreases with a decrease of the opening degree thereof. Thus, by controlling the supply amount of exhaust gas to the spray drying device so that the detection temperature of the temperature detection unit becomes not lower than the evaporation temperature of the wastewater, it is possible to perform the evaporation process of the wastewater by the spray drying device appropriately.

(16) In some embodiments, in any one of the above configurations (5) to (9), the spray drying system further includes a plurality of third flow-rate adjusting parts each of which is disposed in corresponding one of the plurality of downstream-side exhaust gas discharge lines.

With the above configuration (16), it is possible to adjust the balance of the flow rate of exhaust gas returned to each of the plurality of exhaust gas ducts, and equalize the flow rate of exhaust gas returned to each of the plurality of exhaust gas ducts.

(17) In some embodiments, in any one of the above configurations (5) to (9), the spray drying system further includes: a second flow-rate adjusting part disposed in each of the plurality of upstream-side exhaust gas introduction lines; and a third flow-rate adjusting part disposed in each of the plurality of downstream-side exhaust gas discharge lines.

With the above configuration (17), it is possible to equalize the flow rate of exhaust gas returning through each of the plurality of exhaust gas ducts.

(18) In some embodiments, in any one of the above configurations (1) to (17), the spray drying system further includes: a heating device disposed in at least one of the exhaust gas discharge line or a bottom part of the spray drying device.

With the above configuration (18), with the spray drying system including the heating device (e.g. heat trace), in the exhaust gas discharge line or the bottom part of the spray drying device, it is possible to prevent condensation of dust when the plant is stopped, or deliquescence of calcium chloride (CaCl2), which is a wastewater component.

(19) In some embodiments, in any one of the above configurations (1) to (18), the spray drying device is configured to spray the wastewater into liquid droplets having an average diameter which is not smaller than 20 μm and not greater than 80 μm, and a maximum diameter of not greater than 250 μm.

With the above configuration (19), it is possible to perform the evaporation processing of wastewater by the spray drying device efficiently.

(20) In some embodiments, in any one of the above configurations (1) to (19), the wastewater is wastewater discharged from a desulfurization system configured to desulfurize the exhaust gas.

With the above configuration (20), it is possible to reduce the discharge amount of wastewater discharged to the outside from the desulfurization system, or perform non-wastewater processing on the wastewater from the desulfurization system.

Advantageous Effects

According to at least one embodiment of the present invention, it is possible to provide a spray drying system which can be applied to an exhaust gas treatment system having a plurality of exhaust gas ducts, which is low-cost and easy to handle, and which has a high installability and a high maintainability.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIGS. 1 to 7 are each a schematic configuration diagram of an exhaust gas treatment system 6 including a spray drying system 1 according to an embodiment of the present invention. The exhaust gas treatment system 6 is a system that removes NOx, SOx, soot dust, or the like from exhaust gas G discharged from an exhaust gas generation source that generates exhaust gas G by combusting a fuel. FIGS. 1 to 7 depict the exhaust gas treatment system 6 installed in a thermal power plant. The exhaust gas treatment system 6 removes nitrogen oxide (NOx), sulfur oxide (SOx), soot dust (PM), or the like from exhaust gas G discharged from a boiler such as a coal burning boiler that uses coal, sludge solid substances, or the like as a fuel, or an oil burning boiler that uses heavy oil, sludge oil, or the like as a fuel, and then discharges exhaust gas G outside the system from a stack 87. Hereinafter, the boiler 81 will be described as the exhaust gas generation source.

Figure 1:
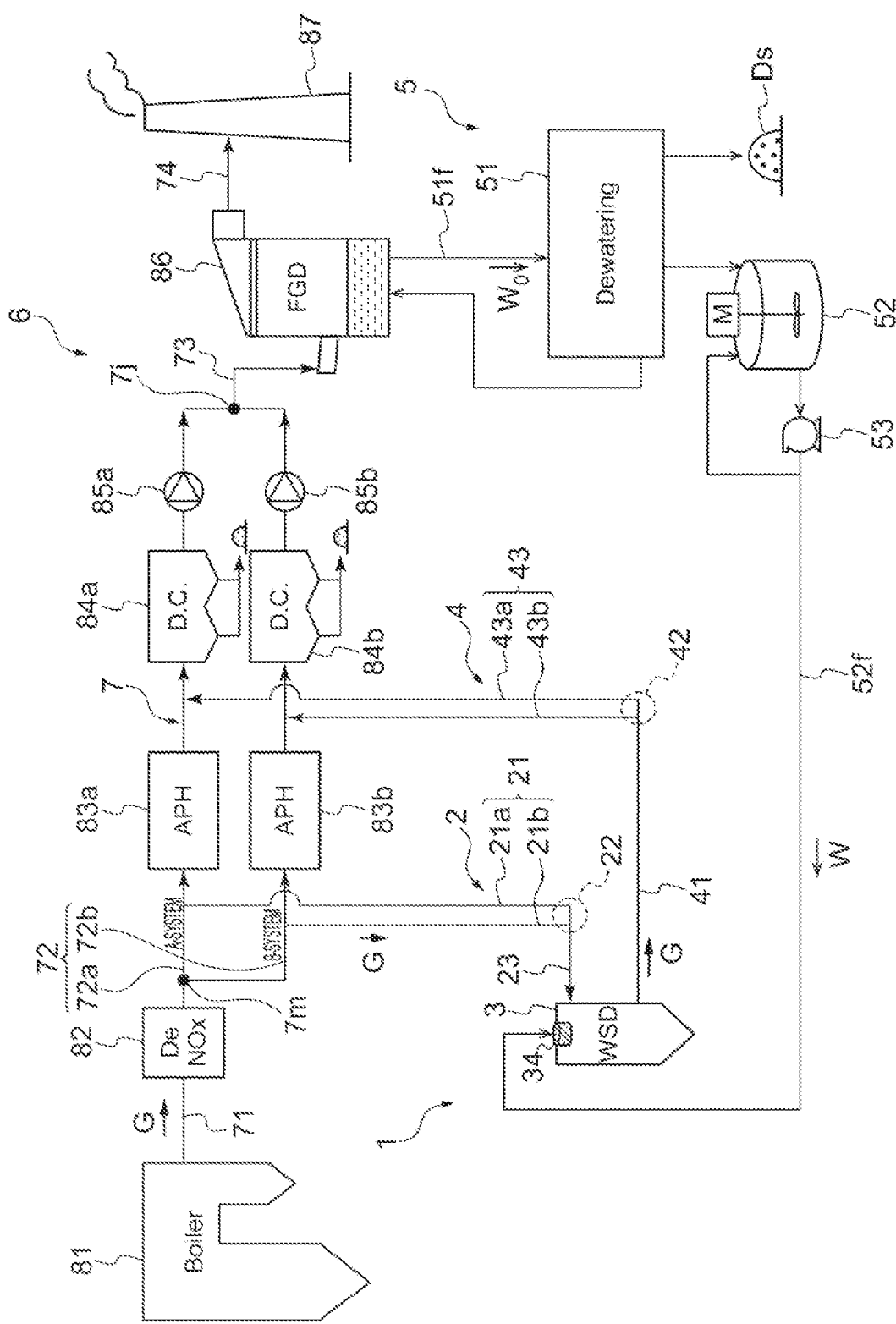
FIG. 1 is a schematic configuration diagram of an exhaust gas treatment system having a spray drying system according to an embodiment of the present invention, where the flue gas duct of the boiler branches into two downstream the denitration device to form two exhaust gas ducts each including a heat exchanger.
Figure 2:
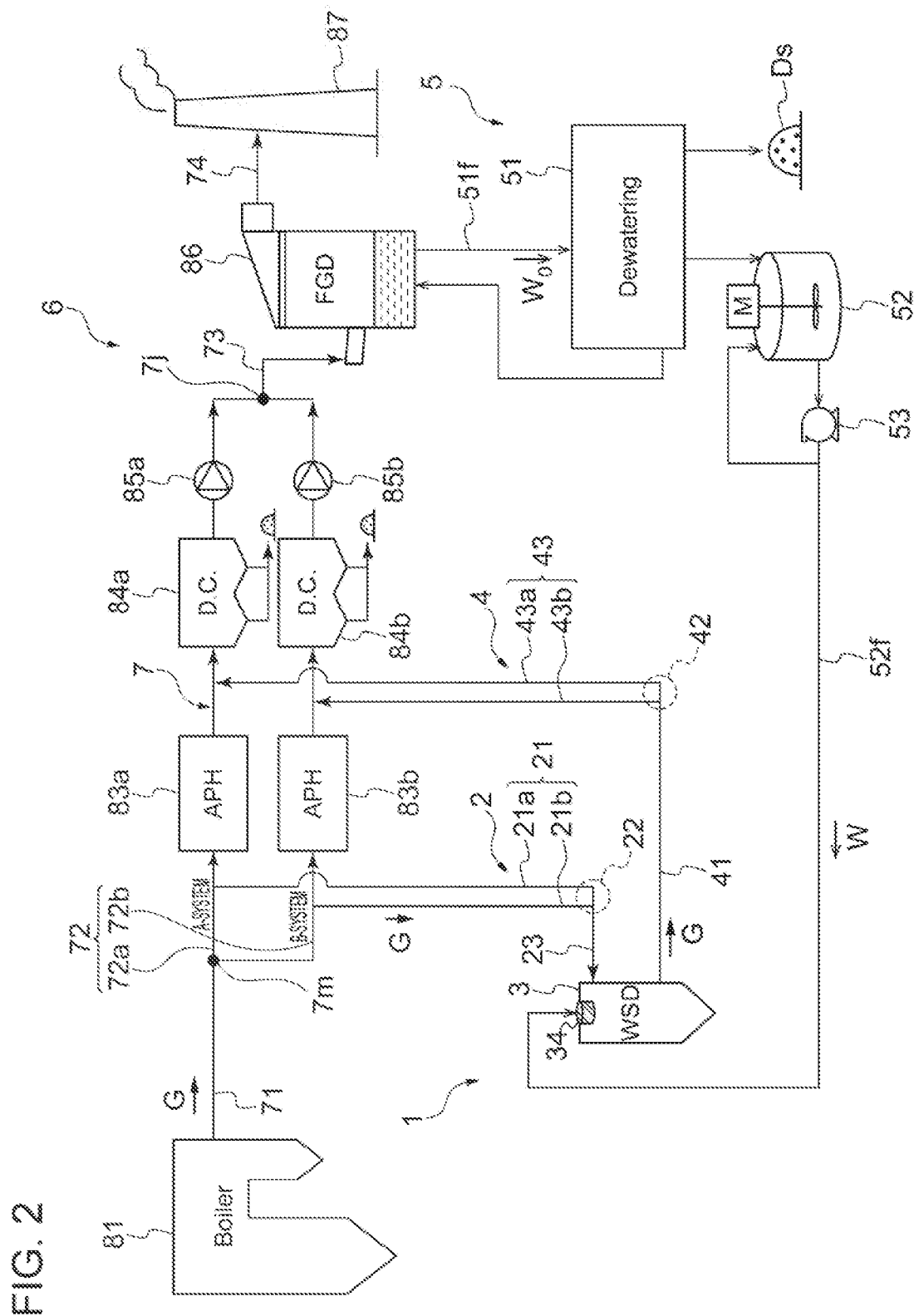
FIG. 2 is a schematic configuration diagram of an exhaust gas treatment system including a spray drying system according to an embodiment of the present invention, corresponding to a case without the denitration device in FIG. 1.
Figure 3:
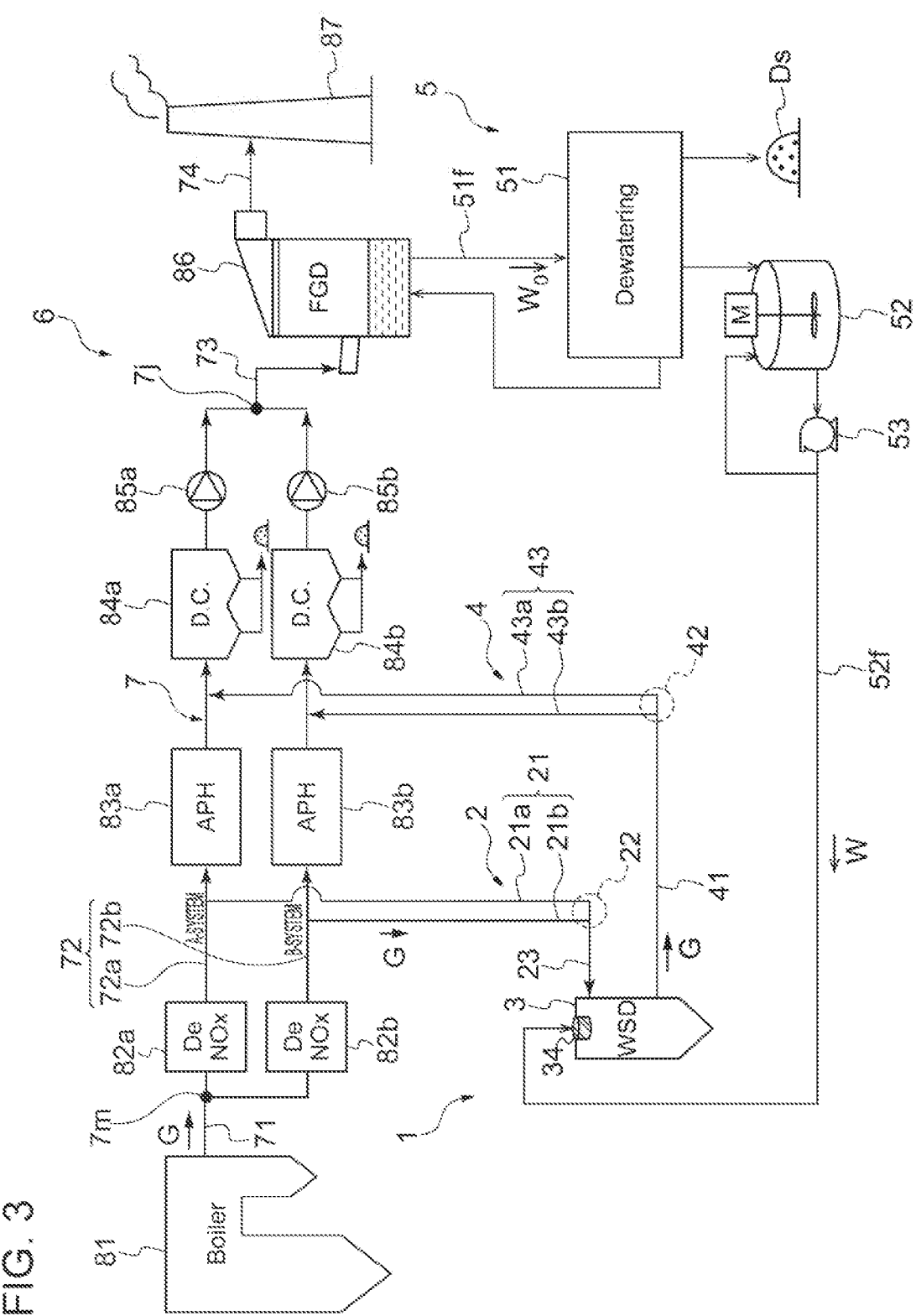
FIG. 3 is a schematic configuration diagram of an exhaust gas treatment system having a spray drying system according to an embodiment of the present invention, corresponding to a case where a denitration device is disposed in each of the two exhaust gas ducts in FIG. 1.
Figure 4:
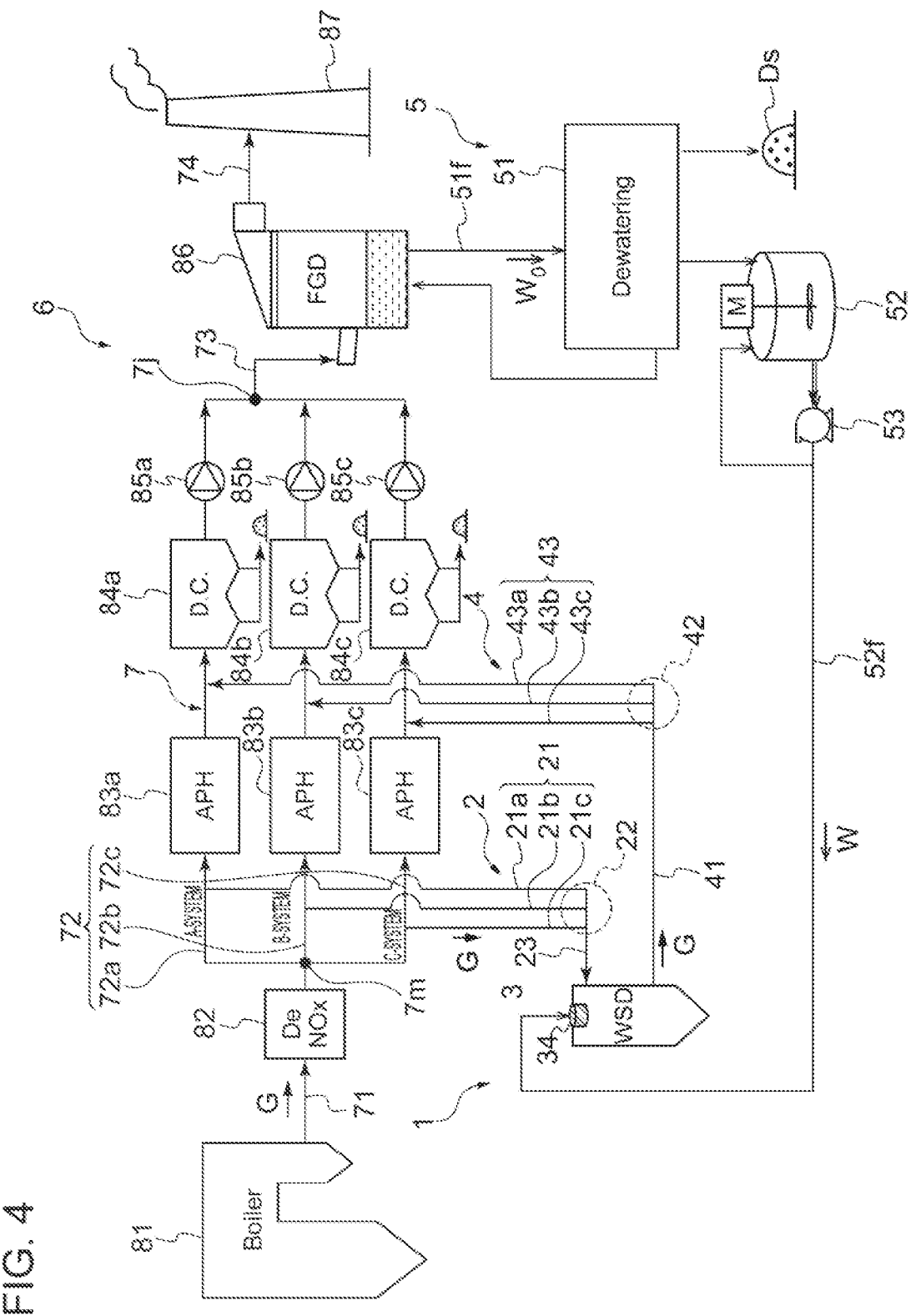
FIG. 4 is a schematic configuration diagram of an exhaust gas treatment system having a spray drying system according to an embodiment of the present invention, where the flue gas duct of the boiler branches into three downstream the denitration device to form three exhaust gas ducts each including a heat exchanger.

First, the exhaust gas treatment system 6 of the thermal power plant depicted in FIGS. 1 to 7 will be described. As depicted in FIGS. 1 to 7, the exhaust gas treatment system 6 includes an upstream flue gas duct 71 for guiding exhaust gas G discharged from the boiler 81 (exhaust gas generation source) to outside, two exhaust gas ducts 72 (72a, 72b) formed by branching into two from the upstream flue gas duct 71 and disposed parallel to each other, and various facilities for processing exhaust gas G that flows through the upstream flue gas duct 71, the exhaust gas ducts 72, a downstream flue gas duct 73, and a downstream flue gas duct 74. The plurality of exhaust gas ducts 72 are formed as a plurality of ducts branched from the upstream flue gas duct 71. For instance, in FIGS. 1 to 3, and 5 to 7, the exhaust gas ducts 72 include two systems (A system 72a, B-system 72b). In FIG. 4, the exhaust gas ducts 72 include three systems (A-system 72a, B-system 72b, C-system 72c). Further, in the embodiment depicted in FIGS. 1 to 7, the various facilities include a single or plurality of heat exchangers (air preheaters) 83 (APH) that exchange heat with exhaust gas G, a plurality of first dust collectors 84 (DC) that remove soot dust contained in exhaust gas G after heat recovery, a first induced draft fan 85 (induced draft blower) that guides exhaust gas G from upstream toward downstream, a desulfurization system 86 (FGD) for removing sulfur oxide from exhaust gas G after dust removal, and a stack 87 that discharges the exhaust gas G outside. Further, in some embodiments, as depicted in FIGS. 1, 3 to 7, the exhaust gas treatment system 6 may further include a denitration device 82 that removes nitrogen oxide from exhaust gas G, disposed on the upstream side of the heat exchanger 83, in addition to the above various facilities. Further, the first dust collector 84 may be an electric dust collector that captures soot dust (particles) in the exhaust gas G, by applying electric charge to the soot dust and attracting the soot dust to a dust collecting electrode.

Further, the above described facilities are disposed in series in the flue gas duct 7, in the following order, from the upstream side closer to the exhaust gas generation source and the downstream side far from the exhaust gas generation source: the denitration device 82, the heat exchanger 83, the first dust collector 84, the first induced draft fan 85, the desulfurization system 86, and the stack 87. Accordingly, the exhaust gas G is processed (purified) in stages. Further, the above heat exchanger 83 is provided so as to improve the boiler efficiency by heating the boiler combustion air in thermal power generation. Thus, in some other embodiments, the exhaust gas treatment system 6 may not necessarily include the heat exchanger 83, if there is no need to provide the heat exchanger 83 (e.g. power plants other than thermal power plants, garbage incinerators, chemical plants). Further, the denitration device 82 is not an essential facility either. In a case where exhaust gas G from the boiler 81 does not contain nitrogen oxide or mercury, the denitration device 82 may be omitted.

Further, as depicted in FIGS. 1 to 4, and 6 to 7, in some embodiments, the plurality of exhaust gas ducts 72 are formed by branching into a plurality of gas ducts at the system branch part 7m, from a single flue gas duct (upstream flue gas duct 71) that guides exhaust gas generated in the boiler 81 to outside. In this case, in some embodiments, as depicted in FIGS. 1 to 4, and 7, the plurality of exhaust gas ducts 72 (72a to 72c) may include the above described heat exchangers 83 (83a to 83c), the first dust collectors 84 (84a to 84c), and the first induced draft fans 85 (85a to 85c), respectively. In this case, the denitration device 82 may be disposed in the upstream flue gas duct 71 upstream of the system branch part 7m (see FIGS. 1, 4, and 7), or in each of the plurality of exhaust gas ducts 72 (72a, 72b) (see FIG. 3).

Figure 6:
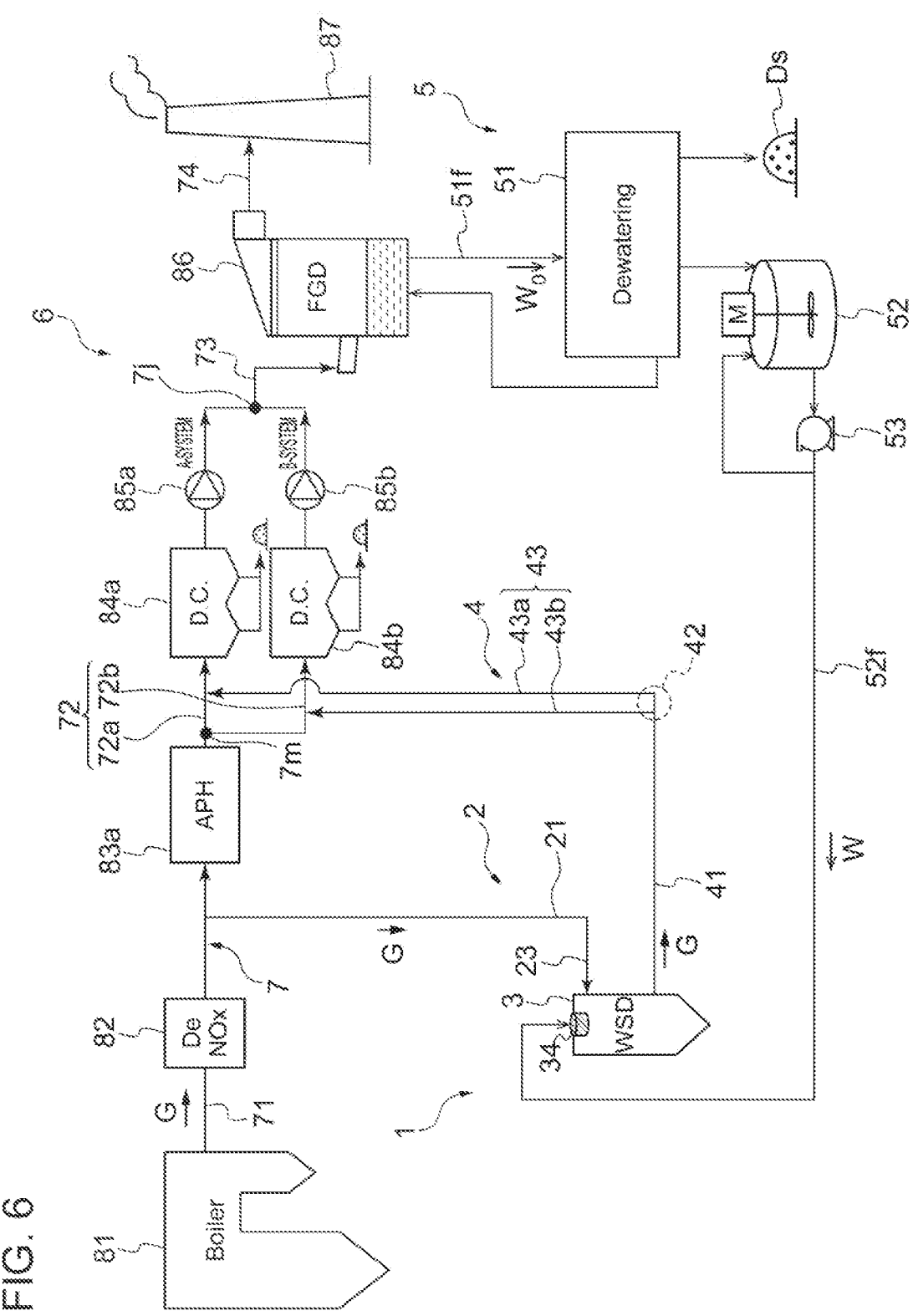
FIG. 6 is a schematic configuration diagram of an exhaust gas treatment system having a spray drying system according to an embodiment of the present invention, where the flue gas duct of the boiler branches into two downstream the heat exchanger to form two exhaust gas ducts each including a first duct collector.

In some embodiments, as depicted in FIG. 6, the heat exchanger 83 may be disposed in the upstream flue gas duct 71, and the first dust collector 84 and the first induced draft fan 85 may be disposed in each of the plurality of exhaust gas ducts 72.

Figure 5:
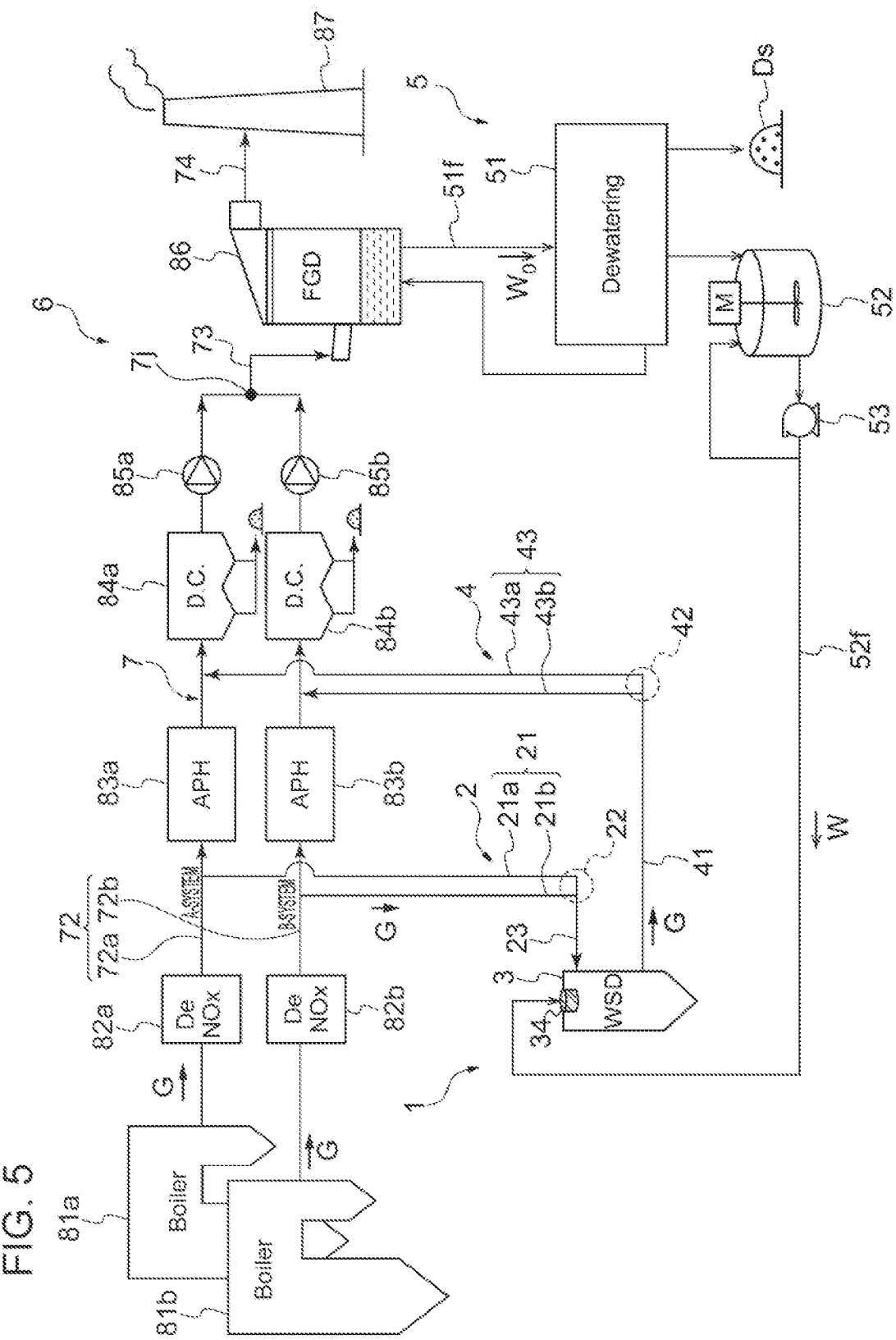
FIG. 5 is a schematic configuration diagram of an exhaust gas treatment system including a spray drying system according to an embodiment of the present invention, where respective flue gas ducts of a plurality of boilers are combined to form a plurality of exhaust gas ducts.

In some other embodiments, as depicted in FIG. 5, the plurality of exhaust gas ducts 72 may be formed by arranging and combining the respective flue gas ducts 7 of two or more boilers 81 (in FIG. 5, the boilers 81 include two boilers 81a and 81b). In this case, the denitration device 82, the heat exchanger 83, the first dust collector 84, and the first induced draft fan 85 are disposed in each of the plurality of flue gas ducts 7 (exhaust gas ducts 72).

Further, in the embodiment depicted in FIGS. 1 to 7, the respective exhaust gas ducts 72 merge at the system merge part 7j disposed downstream, and a single flue gas duct (downstream flue gas ducts 73, 74) is disposed further downstream from the system merge part 7j. Further, the above described desulfurization system 86 and the stack 87 are disposed in the downstream flue gas ducts 73, 74. Further, in some other embodiments, the desulfurization system 86, or the desulfurization system 86 and the stack 87 may be also disposed in each of the plurality of exhaust gas ducts 72.

Further, in some embodiments, the exhaust gas duct 72 may include three or more systems.

As described above, in the embodiment depicted in FIGS. 1 to 7, the plurality of exhaust gas ducts 72 each have an end connected to the upstream flue gas duct 71 (upstream portion) of the flue gas duct 7 for guiding exhaust gas generated in the boiler (exhaust gas generation source) 81 to outside, and another end connected to the downstream flue gas duct 73 (downstream portion) corresponding to the downstream portion of the flue gas duct. The plurality of exhaust gas ducts 72 form the intermediate section of the flue gas duct 7.

Next, the spray drying system 1 according to an embodiment of the present invention will be described.

As depicted in FIGS. 1 to 7, the spray drying system 1 is a system for drying wastewater W to be dried. Further, the spray drying system 1 includes at least one spray drying device 3 configured to bring exhaust gas G into contact with wastewater W, an exhaust gas introduction line 2 (duct) connecting the spray drying device 3 and the plurality of exhaust gas ducts 72 to introduce exhaust gas G from the plurality of exhaust gas ducts 72 to the spray drying device 3, an exhaust gas discharge line 4 (duct) connecting the spray drying device 3 and the plurality of exhaust gas ducts 72 to discharge exhaust gas G introduced into the spray drying device 3, and a wastewater introduction device 5 that introduces (supplies) wastewater W to the spray drying device 3 (see FIGS. 1 to 7). Further, the spray drying system 1 supplies wastewater W discharged from the exhaust gas treatment system 6 to the spray drying device 3, and dries wastewater W (evaporate liquid component) by using heat of the high-temperature exhaust gas G extracted and introduced from the plurality of exhaust gas ducts 72 via the exhaust gas introduction line 2. Further, exhaust gas G used to dry the wastewater W is returned to the plurality of exhaust gas ducts 72 via the exhaust gas discharge line 4 (return flow).

In the embodiment depicted in FIGS. 1 to 7, the spray drying system 1 is configured to dry wastewater W (i.e. desulfurization wastewater $W_0$) discharged from the desulfurization system 86 configured to desulfurize exhaust gas G flowing through the downstream flue gas duct 73. As the desulfurization system 86, normally used is a wet-type desulfurization system that removes sulfur oxide from exhaust gas G through gas-liquid contact between an alkali absorption liquid and exhaust gas G. Specifically, in a general wet-type desulfurization system 86, lime slurry (solvent of lime stone powder dissolved in water) is used as an alkali absorption liquid, and the temperature inside the system is adjusted to be approximately 30-80° C., for instance. The lime slurry is supplied to the liquid reservoir in the tower bottom part of the desulfurization system 86 from a slime slurry supply device (not depicted). The lime slurry supplied to the tower bottom part of the desulfurization system 86 is sent to a plurality of nozzles inside the desulfurization system 86 via an absorption liquid feed line (not depicted), and then injected toward the tower top part from the nozzles. As exhaust gas G flowing upward from the tower bottom part of the desulfurization system 86 makes gas-liquid contact with lime slurry injected from the nozzles, the sulfur oxide in exhaust gas G is absorbed by lime slurry, and is separated and removed from the exhaust gas G. The exhaust gas G purified by lime slurry is discharged as purified gas from the tower top part of the desulfurization system 86, and is discharged outside the system from the stack 87.

Further, in the embodiment depicted in FIGS. 1 to 7, the wastewater introduction device 5 includes a solid-liquid separator 51, a wastewater tank 52, and a pump 53. Further, the solid-liquid separator 51 is connected to the desulfurization system 86 via a desulfurization wastewater pipe 51$f$, and thereby desulfurization wastewater W$_0$ discharged from the desulfurization system 86 is introduced into the solid-liquid separator 51. As the solid-liquid separator 51, for instance, a belt filter, a centrifugal separator, a drum filter, a cyclone, a decanter-type centrifugal sedimentation device may be used. The solid-liquid separator 51 is for separating a solid component Ds containing gypsum and a separated filtrate being a liquid component in the desulfurization wastewater W$_0$. From the desulfurization wastewater W$_0$ discharged from the desulfurization system 86, a solid component Ds such as gypsum is separated by the solid-liquid separator 51. The separated solid component Ds is discharged outside the system. Furthermore, the separated filtrate, which is a separated liquid, is sent to the spray drying device 3 via the wastewater line 52$f$. Further, in the embodiment depicted in FIGS. 1 to 7, the separated filtrate is temporarily stored in the wastewater tank 52, and the pump 53 is configured to send the separated filtrate to the spray drying device 3 (separated filtrate=wastewater W introduced into the spray drying device 3).

In the spray drying system 1 having the above configuration, the number of spray drying device 3 is smaller than the number of exhaust gas ducts 72. That is, instead of connecting one spray drying device 3 to each of the plurality of exhaust gas ducts 72, the spray drying device 3 is connected to the plurality of exhaust gas ducts 72 so that the plurality of exhaust gas ducts share the spray drying device 3 via the exhaust gas introduction line 2 and the exhaust gas discharge line 4, and thereby the number of the spray drying device 3 is smaller than the number of exhaust gas ducts 72. For instance, as described below, the single exhaust gas introduction line 2 connected to the spray drying device 3 may be branched into a plurality of lines and connected to the respective exhaust gas ducts 72 on the upstream side (the side of the exhaust gas ducts 72), to allow the spray drying device 3 to be shared by the plurality of exhaust gas ducts 72. Alternatively, the spray drying device 3 may be connected to the exhaust gas introduction lines 2 connected to the respective exhaust gas ducts 72, to allow the spray drying device 3 to be shared by the plurality of exhaust gas ducts 77.

In the embodiment shown in FIGS. 1 to 7, the number of the spray drying device 3 is one. Meanwhile, in the embodiments depicted in FIGS. 1 to 3, and 5 to 7, the exhaust gas ducts 72 include two systems (A-system 72$a$ and B-system 72$b$), and the number of exhaust gas ducts is two. Thus, the number of the spray drying device 3 (one) is smaller than the number of exhaust gas ducts 72 (two). Furthermore, in the embodiment depicted in FIG. 4, the exhaust gas ducts 72 include three systems (A-system 72$a$, B-system 72$b$, and C-system 72$c$), and the number of the exhaust gas ducts is three. Thus, the number of spray drying device 3 (one) is smaller than the number of exhaust gas ducts 72 (three). Accordingly, compared to a case where as many spray drying devices 3 as the exhaust gas ducts 72 are provided, it is possible to reduce the facility costs and the maintenance costs, for the number of the spray drying device 3 is smaller.

Nevertheless, the embodiments depicted in FIGS. 1 to 7 are not limitative, and two or more spray drying devices 3 may be shared by two or more exhaust gas ducts 72. Specifically, two spray drying devices 3 may be provided for three exhaust gas ducts 72. In this case, for instance, one spray drying device 3 may be connected to each of the A-system exhaust gas duct 72$a$ and the B-system exhaust gas duct 72$b$, and another spray drying device 3 may be connected to the C-system exhaust gas duct 72$c$. Alternatively, each of the two spray drying devices 3 may be connected to each of the A-system, B-system, and C-system exhaust gas ducts.

With the above configuration, the spray drying system 1 includes fewer spray drying devices 3 than the exhaust gas ducts 72. As described above, with the spray drying device 3 being shared by a plurality of exhaust gas ducts 72, it is possible to provide a spray drying system 1 which is low-cost and easy to handle, and which has a high installability and a high maintainability.

Next, some embodiments related to the exhaust gas introduction line 2 will be described.

In some embodiments, as depicted in FIG. 6 for instance, the exhaust gas introduction line 2 may be connected to a section other than the plurality of exhaust gas ducts 72 (in the example depicted in FIG. 6, to the upstream flue gas duct 71). In this case, the exhaust gas introduction line 2 is not branched midway as in the embodiment described below. Thus, it is possible to simplify the structure, and reduce the limitation due to the installation space. Thus, it is possible to reduce the costs of the spray drying system 1, and improve the installability and maintainability of the spray drying system 1.

In some other embodiments, as depicted in FIGS. 1 to 5, and 7 for instance, the exhaust gas introduction line 2 may be connected to each of the plurality of exhaust gas ducts 72. That is, while the exhaust gas G discharged from the boiler 81 flows downstream toward the outside of the system through each of the plurality of exhaust gas ducts 72, with the exhaust gas introduction line 2 being connected to each of the plurality of exhaust gas ducts 72, exhaust gas G flowing through each of the plurality of exhaust gas ducts 72 is introduced into the spray drying device 3 via the exhaust gas introduction line 2. Accordingly, it is possible to extract (branch) exhaust gas G uniformly from each of the plurality of exhaust gas ducts 72. Furthermore, it is structurally easy to connect the exhaust gas introduction line 2 to the part of the plurality of exhaust gas ducts 72, and thus it is possible to easily add the exhaust gas introduction line 2 for supplying exhaust gas G to the spray drying device 3 to the plurality of exhaust gas ducts 72 of the spray drying system.

More specifically, in some embodiments, as depicted in FIGS. 1 to 5, and 7, the exhaust gas introduction line 2 includes a plurality of upstream-side exhaust gas introduction lines 21 connected to the respective exhaust gas ducts 72, an introduction-side merge part 22 at which the plurality of upstream-side exhaust gas introduction lines 21 merge, and a single downstream-side exhaust gas introduction line 23 connecting the introduction-side merge part 22 and the spray drying device 3. In other words, each of the plurality of upstream-side exhaust gas introduction lines 21 is connected one by one to corresponding one of the plurality of exhaust gas ducts 72, and is connected to the introduction-side merge part 22 so as to be branched from the introduction-side merge part 22. Further, the downstream-side exhaust gas introduction line 23 is connected to the introduction-side merge part 22, so as to form a single flow passage from the introduction-side merge part 22 and allow the exhaust gas G to flow to the spray drying device 3. Thus, the exhaust gas G flowing through each of the plurality of exhaust gas ducts 72 passes through each of the plurality of upstream-side exhaust gas introduction lines 21 to flow to the introduction-side merge part 22, and then merges at the introduction-side merge part 22, to flow through the single downstream-side exhaust gas introduction line 23.

With the above configuration, exhaust gas G from each of the plurality of exhaust gas ducts 72 merges at the introduction-side merge part 22, and then is supplied to the spray drying device 3 through the single downstream-side exhaust gas introduction line 23. Thus, with the exhaust gas introduction line 2 and the spray drying device 3 being connected at one location, it is possible to simplify the configuration of the spray drying device 3. Additionally, in a case where the spray drying device 3 includes a plurality of spray devices 34 such as a two-fluid atomizing nozzle and a rotary atomizer in order to increase the gas-liquid contact area between exhaust gas G and wastewater W, it is possible to supply exhaust gas G evenly to each of the plurality of spray devices 34.

Furthermore, in the embodiment depicted in FIGS. 1 to 5, and 7, as described above, a heat exchanger 83 configured to exchange heat with exhaust gas G is disposed in each of the plurality of exhaust gas ducts 72. That is, one heat exchanger 83 is disposed in each of the plurality of exhaust gas ducts 72, one by one. In this embodiment, in some embodiments, as depicted in the drawings, each of the plurality of exhaust gas introduction lines 2 may be connected to corresponding one of the plurality of exhaust gas ducts 72 on the upstream side of the heat exchanger 83. The temperature of exhaust gas G passing through the exhaust gas duct 72 is reduced through heat exchange at the heat exchanger 83, and thus the temperature of the exhaust gas G flowing through the upstream side of the heat exchanger 83 is higher than the temperature of the exhaust gas G flowing through the downstream side of the heat exchanger 83. Thus, with the above configuration, it is possible to supply the spray drying device 3 with the higher-temperature exhaust gas G before passing through the heat exchanger 83 via the exhaust gas introduction line 2. Accordingly, in the spray drying device 3, it is possible to cause the higher-temperature exhaust gas G to contact the wastewater W, and thus it is possible to improve the efficiency of the wastewater processing by the spray drying device 3.

Further, in some other embodiments, the exhaust gas introduction line 2 may include a plurality of ducts (not depicted) connecting the spray drying device 3 and each of the plurality of exhaust gas ducts 72, so that the exhaust gas introduction line 2 is connected to the plurality of exhaust gas ducts 72.

Next, some embodiments related to the exhaust gas discharge line 4 will be described.

In some embodiments, as depicted in FIGS. 1 to 7, the exhaust gas discharge line 4 includes a single upstream-side exhaust gas discharge line 41 connected to the spray drying device 3, a plurality of downstream-side exhaust gas discharge lines 43 connected to the respective exhaust gas ducts 72, and a discharge-side branch part 42 branched into a plurality of downstream-side exhaust gas discharge lines 43 from the single upstream-side exhaust gas discharge line 41. In other words, the upstream-side exhaust gas discharge lines 41 are connected to the spray drying device 3 so that exhaust gas G is discharged from the spray drying device 3 through a single flow passage. Meanwhile, each of the plurality of downstream-side exhaust gas discharge lines 43 is connected one by one to corresponding one of the plurality of exhaust gas ducts 72, and is connected to the discharge-side branch part 42 so as to be branched from the discharge-side branch part 42. Thus, the exhaust gas G discharged from the spray drying device 3 flows through the single upstream-side exhaust gas discharge line 41 to the discharge-side branch part 42, and is branched from the discharge-side branch part 42 into a plurality of downstream-side exhaust gas discharge lines 43, thus being returned to each of the plurality of exhaust gas ducts 72. The exhaust gas G returned as described above flows downstream through the exhaust gas ducts 72, while being merged with exhaust gas G flowing from the more upstream side of the exhaust gas ducts 72.

With the above configuration, the exhaust gas discharge line 4 is configured to return the exhaust gas G extracted from each of the plurality of exhaust gas ducts 72 and introduced into the spray drying device 3 evenly to each of the plurality of exhaust gas ducts 72 via the exhaust gas discharge line 4 after passing through the spray drying device 3. Accordingly, it is possible to equalize the flow rate of exhaust gas G flowing through each of the plurality of exhaust gas ducts 72, and equalize the processing load of various devices for processing exhaust gas G (e.g. the first dust collector 84 and the first induced draft fan 85 described below) disposed in each of the plurality of exhaust gas ducts 72.

In the embodiment depicted in FIGS. 1 to 7, as described above, a first dust collector 84 configured to remove soot dust contained in the exhaust gas G is disposed in each of the plurality of exhaust gas ducts 72. That is, one dust collector 84 is disposed in each of the plurality of exhaust gas ducts 72, one by one. More specifically, the first dust collector 84 is disposed on the downstream side of the heat exchanger 83 and on the upstream side of the first induced draft fan 85.

In this embodiment, in some embodiments, as depicted in FIGS. 1 to 6, each of the plurality of downstream-side exhaust gas discharge lines 43 of the exhaust gas discharge line 4 is connected to corresponding one of the plurality of exhaust gas ducts 72 on the upstream side of the first dust collector 84. In the embodiment depicted in FIGS. 1 to 6, exhaust gas G returned to the exhaust gas duct 72 through the spray drying system 1 has not passed through a dust collector such as the first dust collector 84, and thus includes dry solid substances and soot dust. Thus, as described above, in each of the plurality of exhaust gas ducts 72, by connecting the downstream-side exhaust gas discharge line 43 to the upstream side of the first dust collector 84, exhaust gas G flowing from the exhaust gas discharge line 4 passes through the first dust collector 84 after being returned to the exhaust gas duct 72, and thereby deprived of soot dust.

With the above configuration, in the spray drying system 1 in which the first dust collector 84 is disposed in each of the plurality of exhaust gas ducts 74, the first dust collector 84 disposed in each of the plurality of exhaust gas ducts 72 can be used to process exhaust gas G returned from the spray drying device 3. Thus, it is possible to avoid additional provision of a dust collector (see FIG. 7) for removing dry solid substances and soot dust contained in exhaust gas G discharged from the spray drying device 3, and thereby it is possible to suppress the facility costs.

Figure 7:
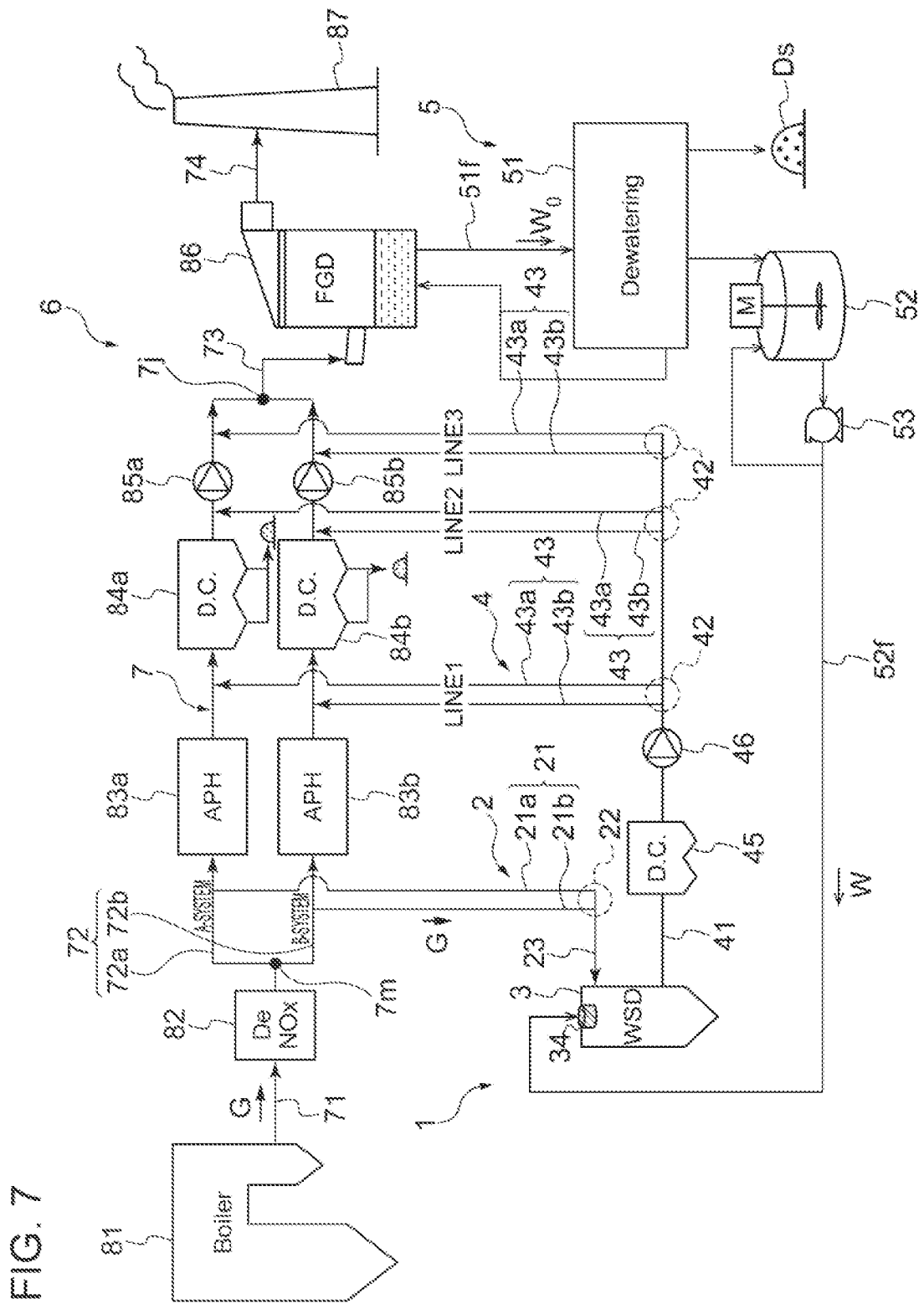
FIG. 7 is a schematic configuration diagram of an exhaust gas treatment system having a spray drying system according to an embodiment of the present invention, where a second dust collector is disposed in an upstream-side exhaust gas discharge line.

In some other embodiments, as depicted in FIG. 7, the spray drying system 1 further includes a second dust collector 45 configured to remove dry solid substances and soot dust contained in exhaust gas G, disposed in the upstream-side exhaust gas discharge line 41 of the exhaust gas discharge line 4. That is, the second dust collector 45 is provided as a facility dedicated to removal of dry solid substances and soot dust contained in exhaust gas G discharged from the spray drying device 3. Accordingly, in the exhaust gas treatment system 6 in which the first dust collector 84 is disposed in each of the plurality of exhaust gas ducts 72, the first dust collector 84 disposed in each of the plurality of exhaust gas ducts 72 does not need to remove dust from exhaust gas G returned from the spray drying device 3, and it is possible to suppress the processing load of the first dust collector 84. In the embodiment depicted in FIG. 7, the second induced draft fan 46 is disposed in the upstream-side exhaust gas discharge line 41, on the downstream side of the second dust collector 45. The second induced draft fan 46 is configured to guide exhaust gas G from the upstream side (the side of the spray drying device 3) toward the downstream side (the side of the plurality of exhaust gas ducts 72).

As described above, in the embodiment in which the second dust collector 45 is disposed in the exhaust gas discharge line 4 (in FIG. 7, the upstream-side exhaust gas discharge line 41), the second dust collector 45 removes dust from exhaust gas G that is returned via the spray drying device 3. Thus, as depicted in FIG. 7 as LINE 1 to LINE 3, it is possible to select the connection position between the exhaust gas discharge line 4 (downstream-side exhaust gas discharge line 43) and the exhaust gas duct 72 from a plurality of positions. For instance, in some embodiments, the connection position may be the upstream side of the first dust collector 84, and in FIG. 7, the connection position is the upstream side of the first dust collector 84, and the downstream side of the heat exchanger 83 (LINE 1 in FIG. 7). In some other embodiments, the connection position may be the downstream side of the first dust collector 84, and the upstream side of the first induced draft fan 85 (LINE 2 in FIG. 7). In some other embodiments, the connection position may be the downstream side of the first induced draft fan 85, and the upstream side of the system merge part 7*j* (LINE 3 in FIG. 7).

With the above configuration, the second dust collector 45 is provided as a facility dedicated to exhaust gas G that is returned via the spray drying device 3. Accordingly, in the exhaust gas treatment system 6 in which the first dust collector 84 is disposed in each of the plurality of exhaust gas ducts 72, the first dust collector 84 disposed in each of the plurality of exhaust gas ducts 72 does not need to remove dust from exhaust gas G discharged from the spray drying device 3 in a substantial way, and it is possible to suppress the processing load of the first dust collector 84 disposed in each of the plurality of exhaust gas ducts 72. Furthermore, in a case where the first induced draft fan 85 (induced draft blower) is disposed in each of the plurality of exhaust gas ducts 72, in a case where the downstream-side exhaust gas discharge line 43 is connected to the exhaust gas duct 72 downstream of the first induced draft fan 85 (LINE 3 in FIG. 7), it is possible to reduce the flow rate of the exhaust gas G flowing the upstream side of the first induced draft fan 85 of the exhaust gas duct 72, and it is possible to reduce the load of the first induced draft fan 85 disposed in each of the plurality of exhaust gas ducts 72. In an embodiment, an effect to reduce approximately 5% of the processing load is confirmed.

Further, in some other embodiments, the exhaust gas discharge line 4 may be connected to the flue gas duct 7 (downstream flue gas duct 73) on the downstream side of the system merge part 7*j*. In this case, the exhaust gas discharge line 4 may be a single line not provided with the discharge-side branch part 42. Also, with this embodiment, an effect similar to the above described embodiment (LINE 1 to LINE 3 in FIG. 7) can be achieved.

Figure 8A:
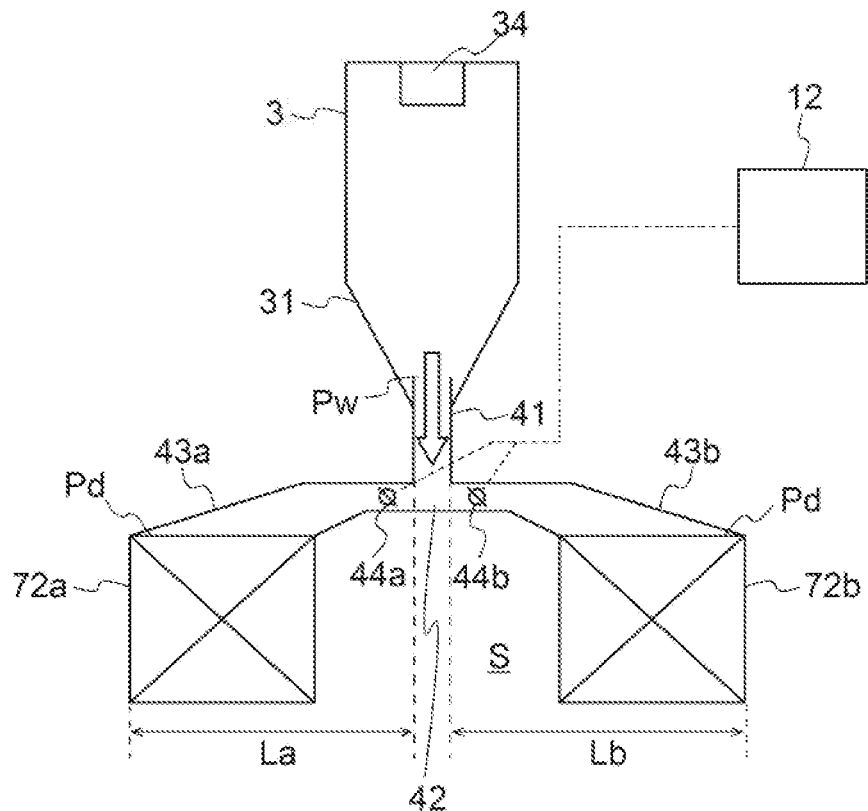
FIG. 8A is a diagram showing the layout where a spray drying device is disposed above a plurality of exhaust gas ducts according to an embodiment of the present invention.
Figure 8B:
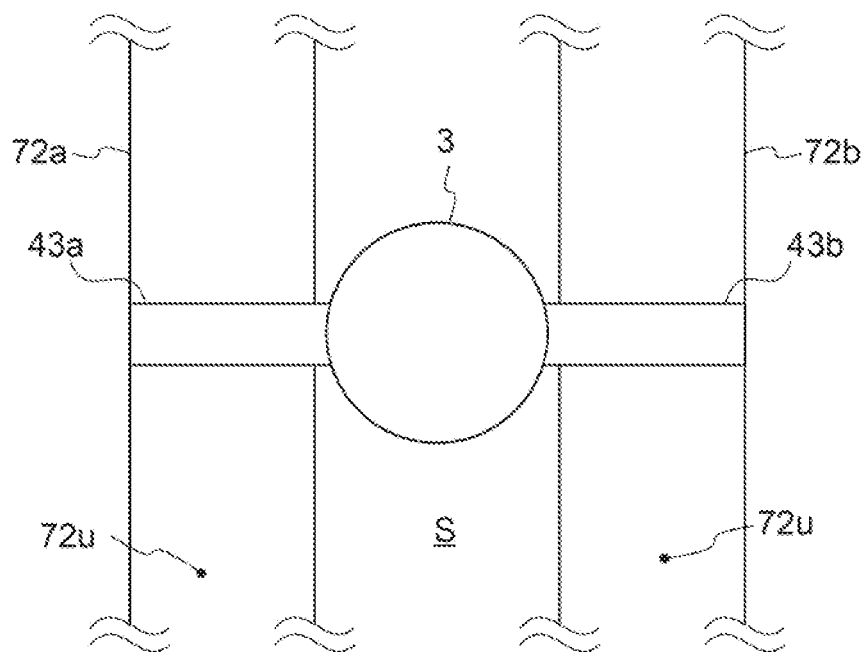
FIG. 8B is a planar view of FIG. 8A.
Figure 9:
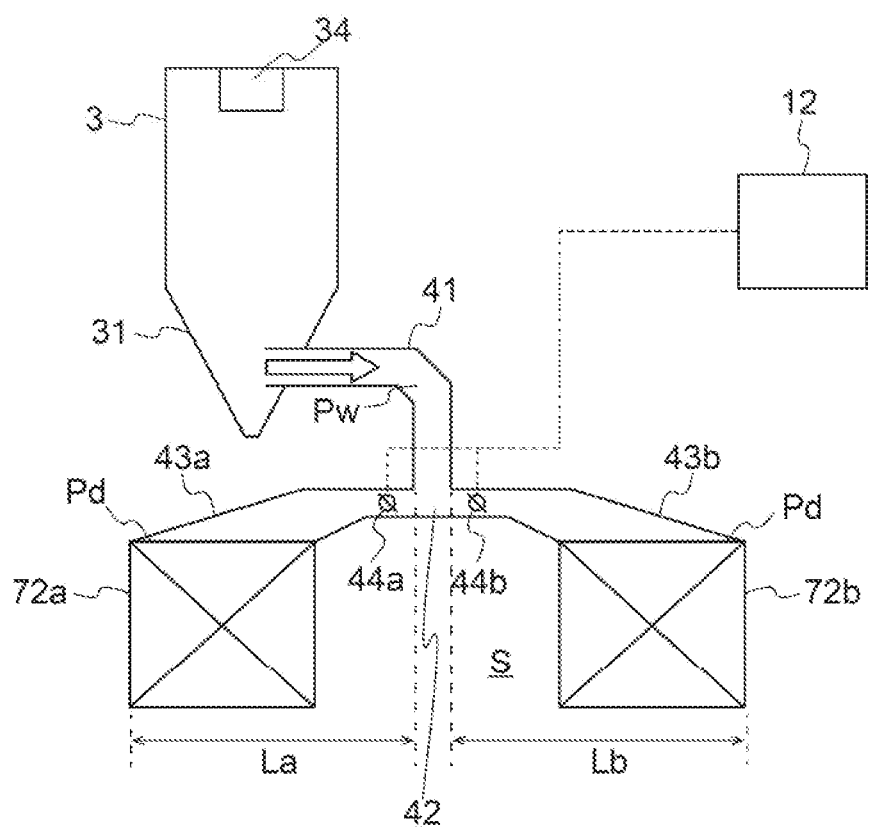
FIG. 9 is a diagram showing the layout where a spray drying device is disposed above one of the plurality of exhaust gas ducts according to another embodiment of the present invention.
Figure 10A:
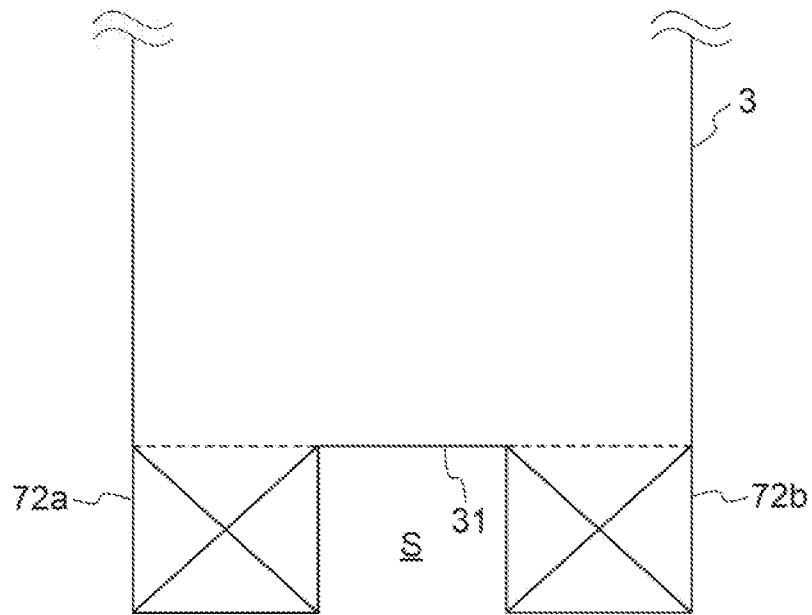
FIG. 10A is a diagram showing a state where the bottom part of a spray drying device according to an embodiment of the present invention is connected to a plurality of exhaust gas ducts.
Figure 10B:
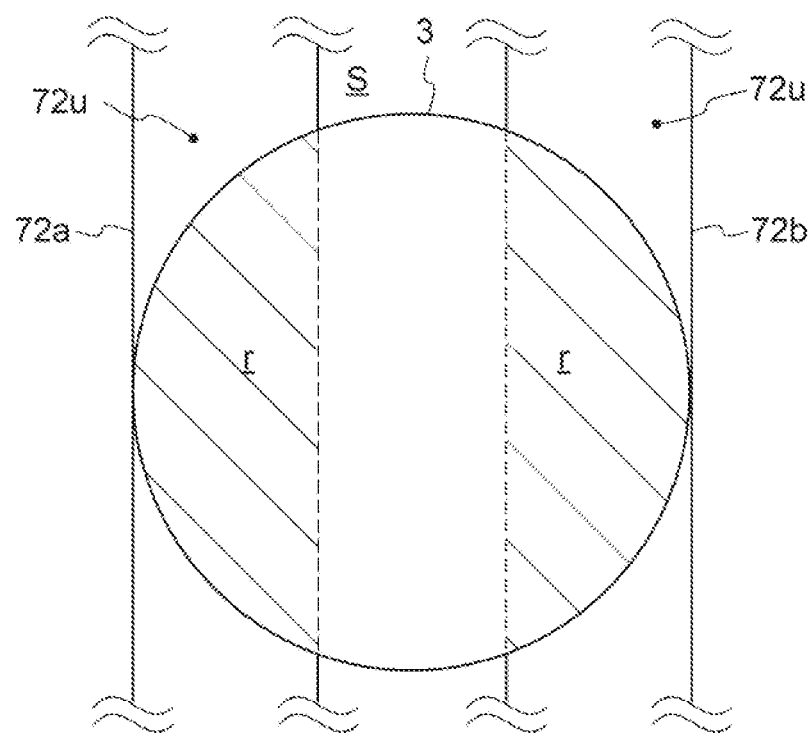
FIG. 10B is a planar view of FIG. 10A.

Next, some embodiments related to the installment aspect of the spray drying device 3 in the spray drying system 1 will be described with reference to FIGS. 8A to 10B. FIG. 8A is a diagram showing the layout where a spray drying device 3 is disposed above a plurality of exhaust gas ducts 72 according to an embodiment of the present invention. FIG. 8B is a planar view of FIG. 8A. FIG. 9 is a diagram showing the layout where a spray drying device 3 is disposed above one of the plurality of exhaust gas ducts 72 according to another embodiment of the present invention. FIG. 10A is a diagram showing a state where the bottom part 31 of a spray drying device 3 according to an embodiment of the present invention is connected to a plurality of exhaust gas ducts 72. FIG. 10B is a planar view of FIG. 10A.

In some embodiments, as depicted in FIGS. 8A to 9, the above described connection position Pw (height position) between the spray drying device 3 and the upstream-side exhaust gas discharge line 41 is above (higher than) the connection position Pd (height position) between each of the plurality of downstream-side exhaust gas discharge line 43 and each of the plurality of exhaust gas ducts 72. In the embodiment depicted in FIGS. 8A and 8B, the spray drying device 3 is positioned directly above the space S formed between two exhaust gas ducts 72: the A-system exhaust gas duct 72*a* and the B-system exhaust gas duct 72*b*. In the embodiment depicted in FIG. 9, the spray drying device 3 is positioned above the A-system exhaust gas duct 72*a*, and not positioned above the center (the vicinity of the center) of the plurality of exhaust gas ducts 72 as a whole like FIG. 8A, but offset toward one side from the center (the vicinity of the center). Thus, dry solid substances and soot dust contained in the exhaust gas G discharged from the spray drying device 3 is carried through the exhaust gas discharge line 4 by the flow of exhaust gas G.

With the above configuration, dry solid substances and soot dust contained in exhaust gas G can pass through the exhaust gas discharge line 4 while falling freely. Accordingly, it is possible to prevent clogging of the exhaust gas discharge line 4 due to dry solid substances and soot dust, and simplify the duct route by shortening the duct length for carrying dry solid substances and soot dust via the exhaust gas discharge line 4.

Further, in some embodiments, as depicted in FIGS. 8A to 9 for instance, the exhaust gas discharge line 4 is connected to the bottom part 31 of the spray drying device 3. In this connection aspect, the connection position (height position) of the discharge-side branch part 42 is below (lower than)

the connection position Pw (height position) between the spray drying device 3 and the upstream-side exhaust gas discharge line 41, and above (higher than) the connection position Pd (height position) between each of the plurality of downstream-side exhaust gas discharge lines 43 and each of the plurality of exhaust gas ducts 72. The bottom part 31 of the spray drying device 3 has a cone shape in a side view, in the embodiment depicted in FIGS. 8A to 9 (see FIGS. 8A, 9). Further, with the above configuration, dry solid substances and soot dust contained in the exhaust gas G having flown to the discharge-side branch part 42 through the upstream-side exhaust gas discharge line 41 flows downward, while being attracted by the gravity, to the exhaust gas duct 72 positioned further below the discharge-side branch part 42.

In addition to the above configuration, further in regard to the horizontal-directional position, the discharge-side branch part 42 is disposed in the center (vicinity of the center) of two outermost exhaust gas ducts of the plurality of exhaust gas ducts 72. In other words, the distances between the discharge-side branch part 42 and the plurality of exhaust gas ducts 72 are the same. Accordingly, exhaust gas is distributed evenly to the plurality of downstream-side exhaust gas discharge lines 43. For instance, in the exhaust gas treatment system 6 (see FIGS. 1 to 3, 5 to 7) including two exhaust gas ducts 72 of A-system and B-system, the above described two outermost exhaust gas ducts are the A-system exhaust gas duct and the B-system exhaust gas duct, in case of which the center (vicinity of the center) is the center (vicinity of the center) of the space S formed between the A-system exhaust gas duct 72 and the B-system exhaust gas duct 72. Furthermore, for instance, in the exhaust gas treatment system 6 (see FIG. 4) including three exhaust gas ducts 72 of A-system, B-system, and C-system, the above described two outermost exhaust gas ducts are the A-system exhaust gas duct and the C-system exhaust gas duct, in case of which the center (vicinity of the center) is the center (vicinity of the center) of the space S formed between the A-system exhaust gas duct 72 and the C-System exhaust gas duct 72. Further, in a case where the A to C-System exhaust gas ducts 72 are disposed at regular intervals, the position of the B-system exhaust gas duct 72 is the center (vicinity of the center). Further, in the embodiment depicted in FIGS. 8A to 9, when the length La is the entire length of the downstream-side exhaust gas discharge line 43*a* connected to the A-system exhaust gas duct 72*a* and the length Lb is the entire length of the downstream-side exhaust gas discharge line 43*b* connected to the B-system exhaust gas duct 72*b*, an expression La=Lb (La≈Lb) is satisfied. Further, in the embodiment depicted in FIGS. 8A to 9, the two downstream-side exhaust gas discharge lines 43 have a symmetric shape with respect to the discharge-side branch part 42, and thereby exhaust gas is distributed more evenly to the plurality of downstream-side exhaust gas discharge lines 43.

Accordingly, with the above configuration, it is possible to distribute exhaust gas evenly to the plurality of downstream-side exhaust gas discharge lines 43 while suppressing clogging of the exhaust gas discharge line 4 due to dry solid substances and soot dust that fall through the exhaust gas discharge line 4 freely.

Further, in some embodiments, as depicted in FIG. 8B, the spray drying device 3 is disposed in the space S between the plurality of exhaust gas ducts 72 in a planar view. Further, in the embodiment depicted in FIGS. 8A and 8B, while the outer shape in the planar view of the spray drying device 3 is within the above space S, the outer shape may be partially out of the space S in some other embodiments.

With the above configuration, it is possible to shorten the distance between the spray drying device 3 and the plurality of exhaust gas ducts 72, shorten the entire length of the exhaust gas discharge line 4 further, and suppress the production costs and maintenance costs.

Further, in some embodiments, as depicted in FIG. 9, the spray drying device 3 is disposed above the exhaust gas duct 72*a*, which is one of the plurality of exhaust gas ducts 72 (72*a*, 72*b*).

Further, in some embodiments, as depicted in FIGS. 10A and 10B, the bottom part 31 of the spray drying device 3 is directly connected to an upper part of each of the plurality of exhaust gas ducts 72. In the embodiment shown in FIGS. 10A and 10B, two exhaust gas ducts 72 including the A-system exhaust gas duct and the B-system exhaust gas duct are disposed directly below the spray drying device 3. Further, as depicted in FIG. 10B, in a planar view, the spray driving device 3 has a circular outer shape, and the bottom part 31 of the spray drying device 3 has a disc shape. Further, the upper surface 72*u* of each of the plurality of exhaust gas ducts 72 and the bottom part 31 of the spray drying device 3 are in communication in an overlapping region r where each upper surface 72*u* and the bottom part 31 overlap, so that exhaust gas G can pass through. Accordingly, it is possible to save the space in the spray drying system 1, and it is no longer necessary to provide the exhaust gas discharge line 4.

Figure 11:
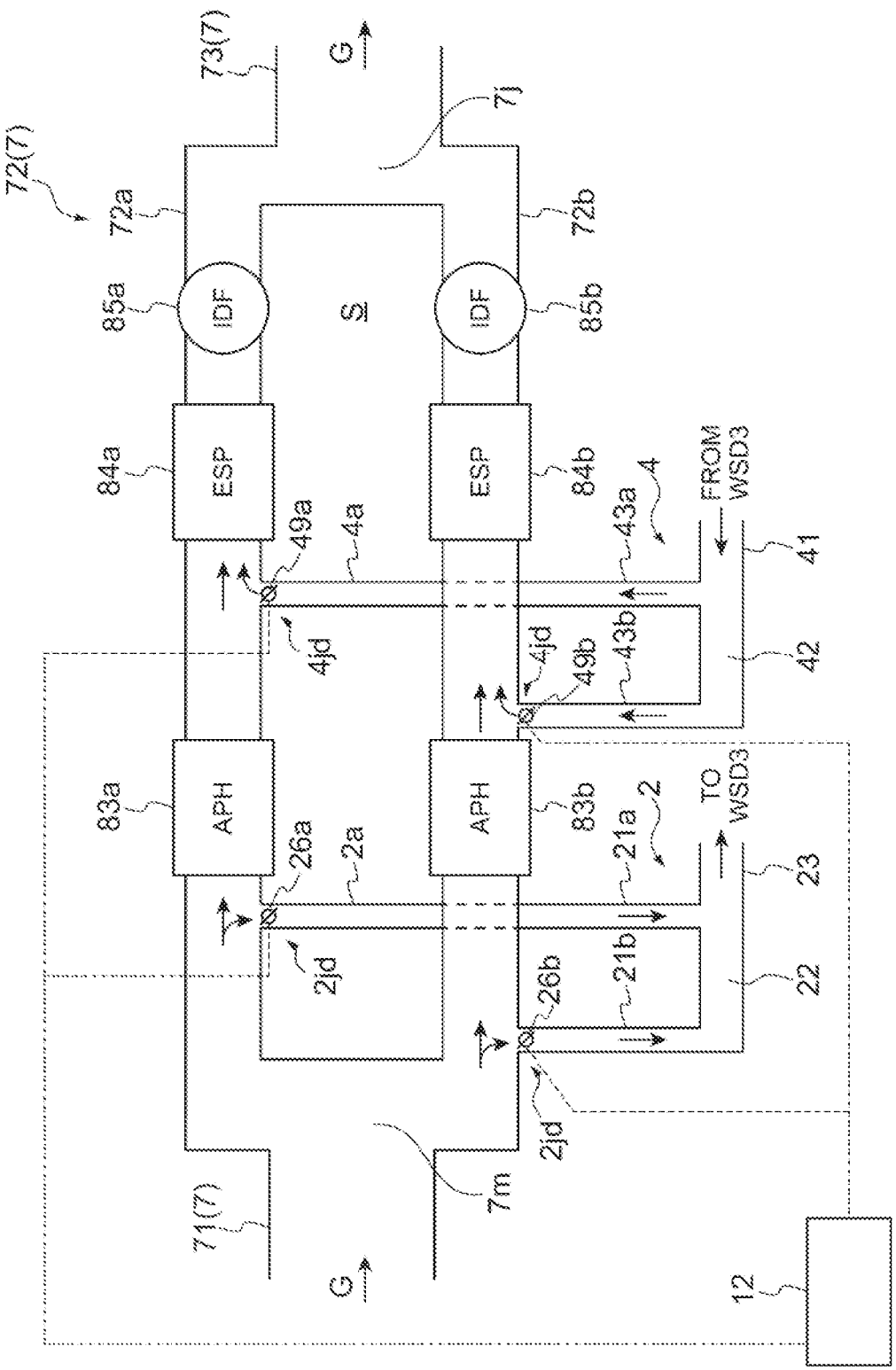
FIG. 11 is a detailed view of the plurality of exhaust gas ducts in FIGS. 1 to 3, and 5 to 7.
Figure 12:
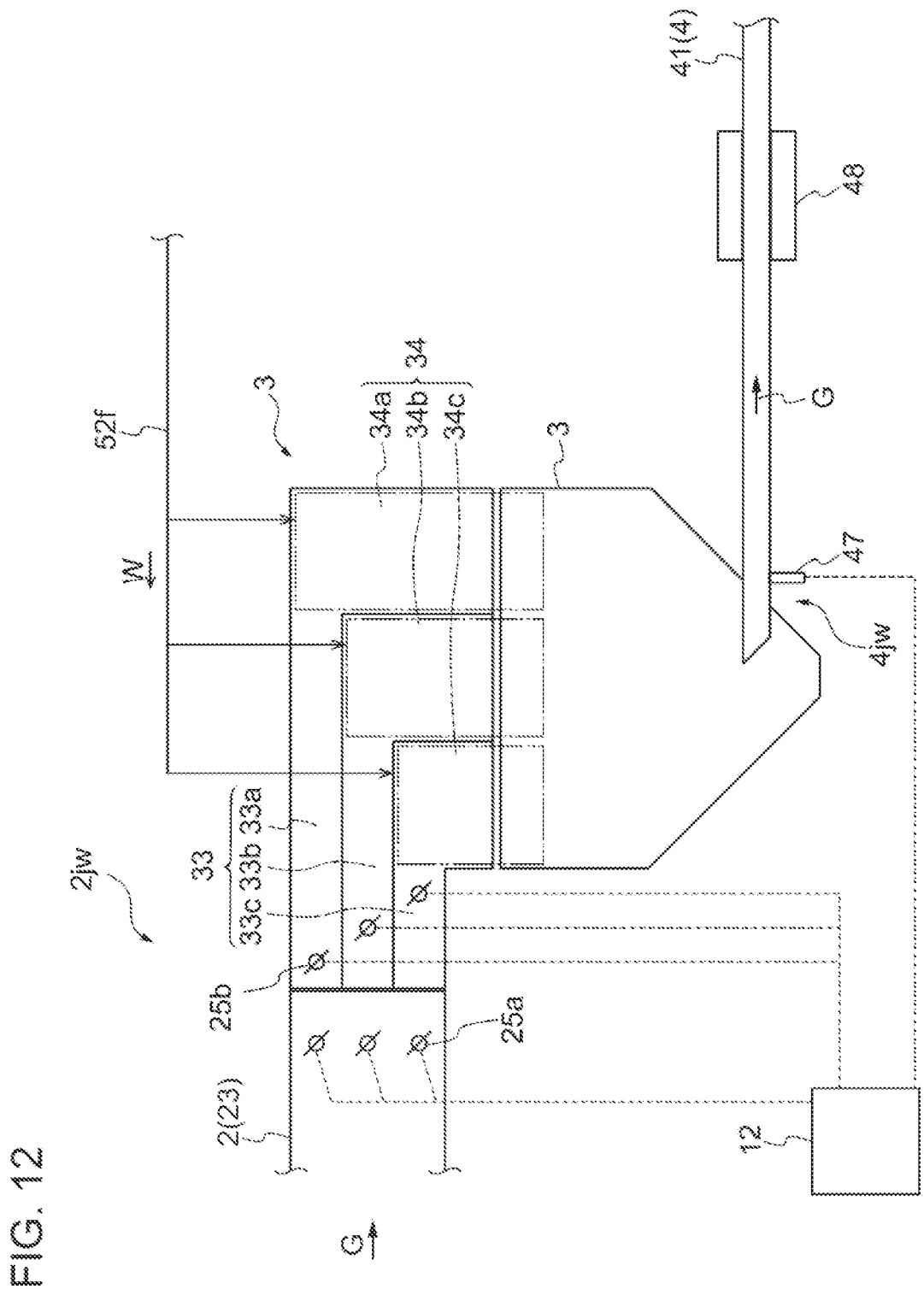
FIG. 12 is an enlarged view showing a connection part between a spray drying device and an exhaust gas introduction line according to an embodiment of the present invention.
Figure 13:
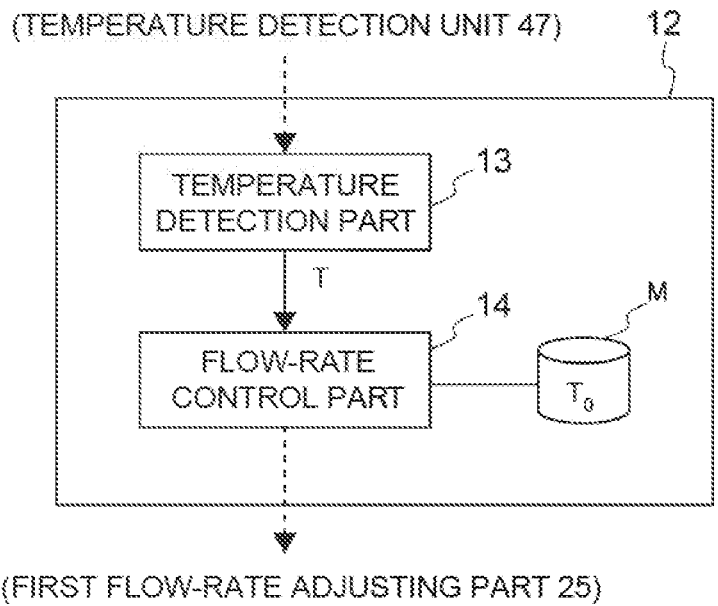
FIG. 13 is a functional block diagram of a control device that controls the first flow-rate adjusting part according to an embodiment of the present invention.
Figure 14:
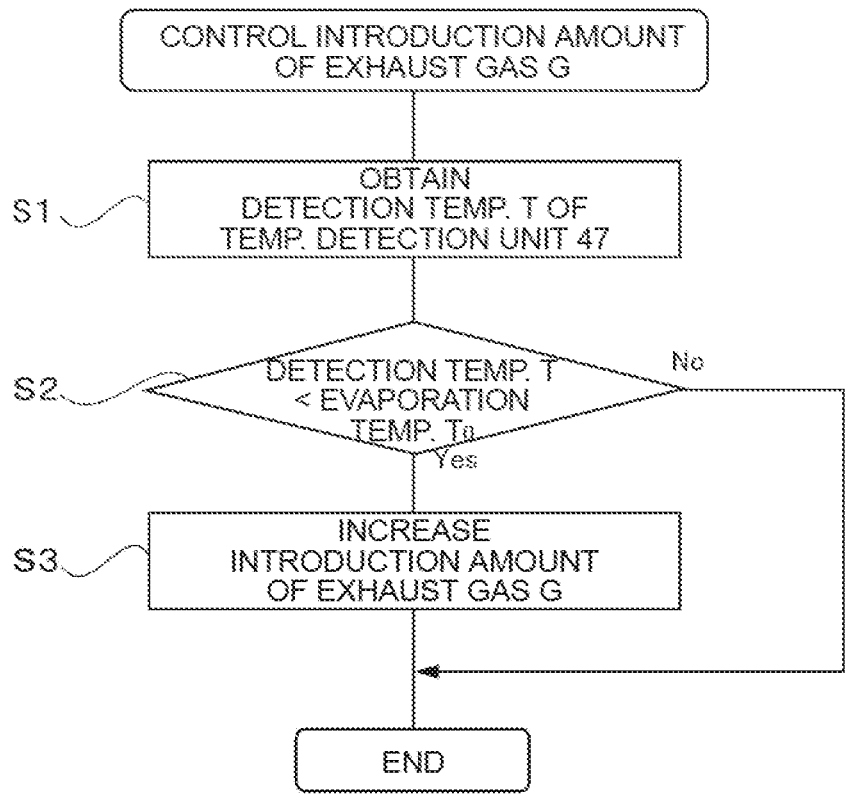
FIG. 14 is a diagram showing the method of controlling the flow rate of exhaust gas according to an embodiment of the present invention.

Next, the operation method of the spray drying system 1 will be described with reference to FIGS. 8A to 9, and FIGS. 11 to 14. FIG. 11 is a detailed view of the plurality of exhaust gas ducts 72 in FIGS. 1 to 3, and 5 to 7. FIG. 12 is an enlarged view showing a connection part 2*jw* between a spray drying device 3 and an exhaust gas introduction line 2 according to an embodiment of the present invention. FIG. 13 is a functional block diagram of a control device 12 that controls the first flow-rate adjusting part 25 according to an embodiment of the present invention. FIG. 14 is a diagram showing the method of controlling the flow rate of exhaust gas according to an embodiment of the present invention.

In some embodiments, as depicted in FIGS. 11 and 12, the spray drying system 1 further includes a first flow-rate adjusting part 25 (see FIG. 12) disposed in a connection part 2*jw* between the exhaust gas introduction line 2 (downstream-side exhaust gas introduction line 23) and the spray drying device 3, and a plurality of second flow-rate adjusting parts 26 disposed in respective connection parts 2*jd* (see FIG. 11) between the plurality of upstream-side exhaust gas introduction lines 21 and the corresponding exhaust gas ducts 72. In the embodiment depicted in FIGS. 11 and 12, the first flow-rate adjusting part 25 and the second flow-rate adjusting part 26 are dampers which enable adjustment of the flow rate of exhaust gas G. Nevertheless, the present embodiment is not limitative. For instance, in some other embodiments, the first flow-rate adjusting part 25 and the second flow-rate adjusting part 26 may be another type of flow-rate adjusting units, such as orifices or flow-rate control valves which enable adjustment of the flow rate of exhaust gas G. Furthermore, as depicted in the drawings, the first flow-rate adjusting part 25 and the second flow-rate adjusting part 26 may be configured to be controlled in accordance with commands from the control device 12 described below.

In the embodiment depicted in FIGS. 11 and 12, as depicted in FIG. 12, the spray drying device 3 includes a plurality of spray devices 34 (in the example depicted in FIG. 12, three spray devices 34*a* to 34*c*), and the exhaust gas G introduced into the spray drying device 3 passes through the inner passages 33 (33*a* to 33*c*) that are in communication with the respective spray devices 34, and makes contact with wastewater W sprayed from the corresponding spray devices 34. Further, the first flow-rate adjusting part 25 includes first flow-rate adjusting parts 25a for controlling the flow rate disposed upstream in the connection part 2jw, and a first flow-rate adjusting part 25b positioned on the downstream side of the first flow-rate adjusting parts 25a and disposed in each of the inner passages 33 described above so as to be capable of permitting or forbidding passage of exhaust gas G. With the above first flow-rate adjusting parts 25b on the downstream side, it is possible to equalize distribution of exhaust gas to the plurality of inner passages 33, thereby equalizing the flow rate of exhaust gas G introduced into each of the plurality of inner passages 33, and equalize the ratio to the sprayed wastewater W, so as to equalize the evaporation conditions of the wastewater W. Accordingly, with the first flow-rate adjusting part 25 disposed on the downstream side of the introduction-side merge part 22, it is possible to supply or stop supply of exhaust gas G to the spray drying device 3 from the exhaust gas introduction line 2 easily, and perform maintenance on the spray drying device 3 easily.

Further, if the second flow-rate adjusting part 26 is not provided for the spray drying system 1, when the first flow-rate adjusting part 25 disposed in the connection part 2*jw* on the side of the spray drying device 3 during operation of the exhaust gas treatment system 6 is closed, exhaust gas G would reach the first flow-rate adjusting part 25, and accumulate in the exhaust gas introduction line 2. Further, when the temperature of exhaust gas G decreases in this accumulation state, $SO_2$ contained in exhaust gas G would elute out, and cause erosion or the like of the exhaust gas introduction line 2. However, by closing the flow-rate adjusting part 25 after closing the second flow-rate adjusting part 26 disposed in the connection part to the exhaust gas duct 72 of the upstream-side exhaust gas introduction line 21, it is possible to avoid accumulation of exhaust gas G the exhaust gas introduction line 2, and prevent the accumulating exhaust gas G from damaging the exhaust gas introduction line 2.

Further, in some embodiments, as depicted in FIGS. 8A to 9, 11, the spray drying system 1 further includes a plurality of third flow-rate adjusting parts 44 disposed in the respective downstream-side exhaust gas discharge lines 43. In the embodiment depicted in FIGS. 8A to 9, 11, as depicted in FIG. 11, the third flow-rate adjusting parts 44 (44*a*, 44*b*) are disposed on the side of the discharge-side branch part 42, of each of the plurality of downstream-side exhaust gas discharge lines 43 (43*a*, 43*b*). Further, the fourth flow-rate adjusting parts 49 (49*a*, 49*b*) are disposed on the connection part 4*jd* between the plurality of downstream-side exhaust gas discharge lines 43 (43*a*, 43*b*) and the plurality of exhaust gas ducts 72 (72*a*, 72*b*). The plurality of third flow-rate adjusting parts 44 (44*a*, 44*b*) and the fourth flow-rate adjusting parts 49 (49*a*, 49*b*) are dampers which enable adjustment of the flow rate of exhaust gas G. Nevertheless, the present embodiment is not limitative. For instance, in some other embodiments, the third flow-rate adjusting parts 44 and the fourth flow-rate adjusting parts 49 may be another type of flow-rate adjusting parts, such as orifices or flow-rate control valves which enable adjustment of the flow rate of exhaust gas G or ON-OFF dampers.

Furthermore, as depicted in FIGS. 8A to 9, and 11, the third flow-rate adjusting part 44 may be configured such that the opening degree of the third flow-rate adjusting part 44 is controlled in accordance with commands from the control device 12 described below. In this case, the control device 12 maybe configured to control each of the plurality of third flow-rate adjusting parts 44 on the basis of the detection value of the flow-rate detection unit, by providing a flow-rate detection unit (e.g. flow meter) capable of detecting the flow rate of exhaust gas G (not depicted) in each of the plurality of downstream-side exhaust gas discharge lines 43.

With the above configuration, it is possible to adjust the balance of the flow rate of exhaust gas G returned to each of the plurality of exhaust gas ducts 72, and equalize the flow rate of exhaust gas G returned to each of the plurality of exhaust gas ducts 72. Further, it is possible to equalize the flow rate of exhaust gas duct returning through each of the plurality of exhaust gas ducts, by using the second flow-rate adjusting part 26 and the third flow-rate adjusting part 44.

Further, in some embodiments, as depicted in FIGS. 12 to 14, the spray drying system 1 further includes a temperature detection unit 47 disposed on the bottom part 31 of the spray drying device 3 or in the exhaust gas discharge line 4, and a control device 12 that controls the first flow-rate adjusting part 25 so that the temperature detected by the temperature detection unit 47 (detection temperature T) is not lower than the evaporation temperature $T_0$ of the wastewater W. The temperature detection unit 47 is a thermometer, for instance. Further, in the embodiment depicted in FIGS. 12 to 14, the temperature detection unit 47 is disposed in the connection part 4*jw* between the spray drying device 3 and the exhaust gas discharge line 4 (upstream-side exhaust gas discharge line 41), so as to detect the temperature of exhaust gas G discharged from the spray drying device 3. In other words, the temperature detection unit 47 is disposed in a position in the exhaust gas discharge line 4 where the temperature obtained by the temperature detection unit 47 can be regarded as the same as the temperature obtained when disposed in the bottom part 31 of the spray drying device 3.

Meanwhile, the control device 12 includes a computer, for instance, including a CPU (processor, not depicted) and a memory M (storage device) such as ROM and RAM. The CPU operates (e.g. computation of data) in accordance with program instructions loaded to a main storage device, and thereby the following functional parts of the control device 12 are implemented. More specifically, as depicted in FIG. 13, the control device 12 includes a temperature detection part 13 connected to the temperature detection unit 47, and a flow-rate control part 14 connected to a flow-rate adjusting part (25, 26, 44, 49) such gas the first flow-rate adjusting part 25 so as to control the flow-rate adjusting part. Further, the flow-rate control part 14 and the temperature detection part 13 are connected inside the control device 12, and the detection temperature T obtained by the temperature detection part 13 on the basis of the detection value detected by the temperature detection unit 47 is input to the flow-rate control part 14.

Further, the flow-rate control part 14 controls the first flow-rate adjusting part 25 by, for instance, comparing the evaporation temperature $T_0$ stored in advance in the memory M (e.g. 170° C.) to the detection temperature T input from the temperature detection part 13, and transmitting commands for adjusting the opening degree of the first flow-rate adjusting part 25 to the first flow-rate adjusting part 25, so that the detection temperature T is not lower than the evaporation temperature $T_0$. Further, the first flow-rate adjusting part 25 performs operation such as changing the opening degree in accordance with a command from the control device 12 (flow-rate control part 14). More specifically, the temperature of exhaust gas G is higher than the temperature of the wastewater W. Further, the flow rate of exhaust gas G supplied to the spray drying device 3 increases with an increase of the opening degree of the first flow-rate adjusting part 25, and decreases with a decrease in the opening degree. Thus, the flow-rate control part 14 transmits commands for opening the opening degree of the first flow-rate adjusting part 25 further, so that a greater amount of high-temperature exhaust gas G is introduced into the spray drying device 3, if the detection temperature T is lower than the evaporation temperature $T_0$. If the detection temperature T is not lower than the evaporation temperature $T_0$, the opening degree of the first flow-rate adjusting part 25 is not changed. Further, in a case where the exhaust gas treatment system 6 includes the heat exchanger 83 (see FIGS. 1 to 7), to improve the heat recovery rate by the heat exchanger 83, the flow-rate control part 14 may transmit a command for further closing the first flow-rate adjusting part 25, so as to reduce the introduction amount of high-temperature exhaust gas G to the spray drying device 3.

The control flow executed by the above control device 12 (exhaust gas flow-rate control method) will be described with reference to FIG. 14. In step S1 of FIG. 14, the control device 12 obtains the detection temperature T by using the temperature detection unit 47. In step S2, the detection temperature T is compared to the evaporation temperature $T_0$ stored in advance in the memory M, and it is determined whether the evaporation temperature $T_0$, is higher than the detection temperature T. As a result, if the evaporation temperature $T_0$ is higher than the detection temperature T, in step S3, the introduction amount of exhaust gas G introduced into the spray drying device 3 is increased. Specifically, a command for further increasing, the opening degree of the first flow-rate adjusting part 25 is generated, and transmitted to the first flow-rate adjusting part 25. In contrast, as a result of determination of step S3, if the evaporation temperature $T_0$ is not higher than the detection temperature T, the control flow is ended in FIG. 3. Nevertheless, as described above, a command for further closing the opening degree of the first flow-rate adjusting part 25 may be transmitted to the first flow-rate adjusting part 25 before ending the control flow.

Further, in the embodiment depicted in FIG. 12, as described above, the first flow-rate adjusting part 25 includes the first flow-rate adjusting part 25*a* for controlling the flow rate of exhaust gas G and the first flow-rate adjusting part 25*b* disposed downstream thereof and disposed in each of the inner passages 33 above the spray drying device 3, and the control device 12 may control at least one of the first flow-rate adjusting parts 25. For instance, in a case where the latter first flow-rate adjusting part 25*b* has only the function to shut down in the spray drying system 1, the control device 12 may control the upstream first flow-rate adjusting part 25*a* on the basis of the detection value of the temperature detection unit 47.

With the above configuration, the temperature detection unit 47 is disposed in the vicinity of the outlet through which exhaust gas G from the spray drying device 3 is discharged. The control device 12 controls the opening degree of the first flow-rate adjusting part 25 so that the detection temperature T obtained on the basis of the detection value of the temperature detection unit 47 is not lower than the evaporation temperature $T_0$ of the wastewater W and thereby controls the flow rate of high-temperature exhaust gas G supplied to the spray drying device 3. That is, since the temperature detection unit 47 is disposed in the vicinity of the outlet of the spray drying device 3, if the detection temperature T is higher than the evaporation temperature $T_0$ of the wastewater W, it can be estimated that the evaporation process of the wastewater W by the spray drying device 3 is properly carried out. Thus, by controlling the supply amount of exhaust gas G to the spray drying device 3 so that the detection temperature T of the temperature detection unit 47 is not lower than the evaporation temperature $T_0$, it is possible to perform the evaporation process of the wastewater W by the spray drying device 3 appropriately.

Next, some embodiments related to the spray drying device 3 will be described.

In some embodiments, as depicted in FIGS. 1 to 7, and 12, the spray drying device 3 includes a spray device 34 capable of spraying wastewater W into the device, so as to increase the gas-liquid contact area between exhaust gas G and the wastewater W. In this way, the diameter of the liquid drop of the wastewater W sprayed by the spray drying device 3 is not smaller than 20 μm and not larger than 80 μm in average, and is not larger than 250 μm at maximum. With the liquid drops of the wastewater W having a smaller diameter, and the avenge diameter of the liquid drops being in a constant range, it is possible to increase the gas-liquid contact area.

In some embodiments, the spray device 34 may be a rotary atomizer capable of spraying the wastewater W so as to from a swirl flow of the wastewater W. In some embodiments, the spray device 34 may be a two-fluid atomizing, nozzle capable of spraying the wastewater W. By using such a spray device 34 to spray the wastewater W, the diameter of the liquid drops of the wastewater W is further reduced, and the surface area of the wastewater W increases. Thus, it is possible to increase the contact area between the exhaust gas G and the wastewater W, and improve the processing efficiency of the spray drying device 3. Further, in some other embodiments, the spray drying device 3 may not necessarily include a spray device 34. Further, in the embodiment depicted in FIG. 12, the spray drying, device 3 includes three spray devices 34 (34*a* to 34*c*). Nevertheless, the spray drying device 3 may include only one spray device, or four or more. Further, the number of spray devices 34 may be the same as the plurality of exhaust, gas ducts 72, or different.

Further, in some embodiments, as depicted in FIG. 12, the spray drying system 1 further includes a heating device 48 disposed in at least one of the exhaust gas discharge line 4 or the bottom part 31 of the spray drying device 3. For instance, dust condensates when operation of the spray drying system 1 is stopped, such as when the plant is stopped. Thus, the heating device 48 is configured to retain the heat so that the temperatures of the spray drying device 3 and the exhaust gas discharge line 4 do not decrease to a predetermined temperature or below, such as 100° C. or below. The above predetermined temperature may be a temperature that enables prevention of deliquescence of $CaCl_2$ (e.g. approximately 150° C.). The heating device 48 may be configured to start at a predetermined temperature or below (e.g. 100° C. or below, or 150° C. or below).

Specifically, in some embodiments, the heating device 48 includes a temperature detection unit such as a thermometer, and may automatically perform monitoring of the temperature and on-off of the heating. In some other embodiments, the above described control device 12 may perform controls such as on-off of the heating device 48 on the basis of the detection value of the temperature detection unit 47 disposed in the bottom part 31 of the above described spray drying device 3 or the exhaust gas discharge line 4. Further, the heating device 48 may be an electric heat trace in some embodiments, and a steam heat trace in some other embodiments.

With the above configuration, with the spray drying system 1 including the heating device 48, in the exhaust gas discharge line 4 or the bottom part 31 of the spray drying device 3, it is possible to prevent condensation of dust when the plant is stopped, or deliquescence of calcium chloride ($CaCl_2$).

The present invention is not limited to the embodiments describe above, but includes embodiments composed of variations of the embodiments described above, and embodiments composed of proper combinations of those embodiments.

Within the specification of the facility of the spray drying system, that is, the range satisfying the capacity, the flow-rate adjusting part disposed in each of the upstream-side exhaust gas introduction line and the downstream-side exhaust gas discharge line may be operated to extract exhaust gas from a plurality of systems into the spray &ling device to use the exhaust gas to dry wastewater and then return to e of the systems, or extract exhaust gas from only one system into the spray drying system to use the exhaust gas to dry wastewater and return the exhaust gas to a plurality of systems, or for instance, it is possible to separate one of the three systems from the spray drying system.

DESCRIPTION OF REFERENCE NUMERALS

1 Spray drying system
12 Control device
13 Temperature detection part
14 Flow-rate control part
M Memory
2 Exhaust gas introduction line
21 Upstream-side exhaust gas introduction line
22 Introduction-side merge part
23 Downstream-side exhaust as introduction line
25 First flow-rate adjusting part
25a First flow-rate adjusting part (A-system)
25b First flow-rate adjusting part (B-system)
25c First flow-rate adjusting part (C-system)
26 Second flow-rate adjusting part
2jd Connection part between upstream-side exhaust gas introduction line and exhaust gas duct
2jw Connection part between downstream-side exhaust gas introduction line and spray drying device
3 Spray drying device
31 Bottom part
33 Timer passage
34 Spray device
4 Exhaust gas discharge line
41 Upstream-side exhaust gas discharge line
42 Discharge-side branch part
43 Downstream-side exhaust gas discharge line
43a Downstream-side exhaust gas discharge line (A-system)
43b Downstream-side exhaust gas discharge line (B-system)
43c Downstream-side exhaust gas discharge line (C-system)
44 Third flow-rate adjusting part
45 Second dust collector
46 Second induced draft fan
47 Temperature detection unit
48 Heating device
49 Fourth flow-rate adjusting part
4jd Connection part between downstream-side exhaust gas discharge line and exhaust gas duct
4jw Connection part between upstream-side exhaust was discharge line and spray drying device
5 Wastewater introduction device
51 Solid-liquid separator
51f Desulfurization wastewater pipe
52 Wastewater tank
52f Wastewater line
53 Pump
6 Exhaust gas treating system
7 Flue gas duct
7j System merge part
7m System branch part
71 Upstream flue gas duct
72 Exhaust gas duct
72a Exhaust gas duct (A-system)
72b Exhaust gas duct (B-system)
72c Exhaust gas duct (C-system)
72u Upper surface of exhaust gas duct
73 Downstream flue gas duct
81 Boiler
82 Denitration device
83 Heat exchanger
84 First dust collector
85 First induced draft fan
86 Desulfurization system
87 Stack
G Exhaust gas
W Wastewater
$W_0$ Desulfurization wastewater
Ds Solid component
Pd Connection position between downstream-side exhaust as discharge line and exhaust gas duct
Pw Connection position between upstream-side exhaust gas discharge line and spray drying device
S Space
r Overlapping region
T Detection temperature
$T_0$ Evaporation temperature

The invention claimed is:

1. A spray drying system for drying wastewater to be dried, the spray drying system comprising:
an exhaust gas introduction line for introducing an exhaust gas discharged from an exhaust gas generation source, the exhaust gas introduction line being connected to a plurality of exhaust gas ducts for allowing the exhaust gas to flow through, the exhaust gas introduction line being configured to extract the exhaust gas from each of the plurality of exhaust gas ducts, the exhaust gas generation source being configured to generate the exhaust gas by combusting a fuel; and
at least one spray drying device connected to the exhaust gas introduction line and configured to bring the exhaust gas introduced from the exhaust gas introduction line into contact with the wastewater, wherein the number of spray drying devices is smaller than the number of the plurality of exhaust gas ducts; and
an exhaust gas discharge line connecting the spray drying device and each of the plurality of exhaust gas ducts, wherein the exhaust gas discharge line includes:
a single upstream-side exhaust gas discharge line connected to the spray drying device;
a plurality of downstream-side exhaust gas discharge lines, wherein a downstream-side exhaust gas discharge line among the plurality of downstream-side exhaust gas discharge lines is connected to each of the plurality of exhaust gas ducts; and
a discharge-side branch part branched into each of the plurality of downstream-side exhaust gas discharge lines from the single upstream-side exhaust gas discharge line.

2. The spray drying system according to claim 1,
wherein a first dust collector configured to remove soot dust contained in the exhaust gas is disposed in each of the plurality of exhaust gas ducts, and
wherein each of the plurality of downstream-side exhaust gas discharge lines of the exhaust gas discharge line is connected to corresponding one of the plurality of exhaust gas ducts on an upstream side of the corresponding first dust collector.

3. The spray drying system according to claim 1,
further comprising a second dust collector disposed in the upstream-side exhaust gas discharge line of the exhaust gas discharge line and configured to remove soot dust contained in the exhaust gas.

4. The spray drying system according to claim 1,
wherein a connection position between the spray drying device and the upstream-side exhaust gas discharge line is positioned above a connection position between each of the respective downstream-side exhaust gas discharge lines and corresponding one of the plurality of exhaust gas ducts.

5. The spray drying system according to claim 4,
wherein the upstream-side exhaust gas discharge line is connected to a bottom part of the spray drying device,
wherein a position of the discharge-side branch part is positioned below the connection position between the spray drying device and the upstream-side exhaust gas discharge line, and above the connection position between each of the plurality of downstream-side exhaust gas discharge lines and corresponding one of the plurality of exhaust gas ducts, and
wherein the position of the discharge-side branch part is positioned in the middle of two exhaust gas ducts disposed outermost of the plurality of exhaust gas ducts.

6. The spray drying system according to claim 1, further comprising a plurality of third flow-rate adjusting parts each of which is disposed in corresponding one of the plurality of downstream-side exhaust gas discharge lines, the third flow-rate adjusting part being capable of adjusting a flow rate of the exhaust gas flowing in each of the plurality of downstream-side exhaust gas discharge lines.

7. The spray drying system according to claim 1,
wherein the exhaust gas introduction line includes:
a plurality of upstream-side exhaust gas introduction lines wherein an upstream-side exhaust gas introduction line among the plurality of upstream-side exhaust gas introduction lines is connected to each of the plurality of exhaust gas ducts;
an introduction-side merge part at which each of the plurality of upstream-side exhaust gas introduction lines merge; and
a single downstream-side exhaust gas introduction line connecting the introduction-side merge part and the at least one spray drying device,
wherein the spray drying system further comprises:
a second flow-rate adjusting part disposed in each of the plurality of upstream-side exhaust gas introduction lines, the second flow-rate adjusting part being capable of adjusting a flow rate of the exhaust gas flowing in each of the plurality of upstream-side exhaust gas introduction lines; and
a third flow-rate adjusting part disposed in each of the plurality of downstream-side exhaust gas discharge lines, the third flow-rate adjusting part being capable of adjusting a flow rate of the exhaust gas flowing in each of the plurality of downstream-side exhaust gas discharge lines.

8. The spray drying system according to claim 1, further comprising a heating device disposed in at least one of the exhaust gas discharge line or a bottom part of the spray drying device, the heating device being configured to heat in at least one of the exhaust gas discharge line or the bottom part of the spray drying device.

9. The A spray drying system for drying wastewater to be dried, the spray drying system comprising:
an exhaust gas introduction line for introducing an exhaust gas discharged from an exhaust gas generation source, the exhaust gas introduction line being connected to a plurality of exhaust gas ducts for allowing the exhaust gas to flow through, the exhaust gas introduction line branches from each of the plurality of exhaust gas ducts and being configured to extract the exhaust gas from each of the plurality of exhaust gas ducts, the exhaust gas generation source being configured to generate the exhaust gas by combusting a fuel; and
at least one spray drying device connected to the exhaust gas introduction line and configured to bring the exhaust gas introduced from the exhaust gas introduction line into contact with the wastewater,
wherein the exhaust gas introduction line includes:
a plurality of upstream-side exhaust gas introduction lines, wherein an upstream-side exhaust gas introduction line among the plurality of upstream-side exhaust gas introduction lines is connected to each of the plurality of exhaust gas ducts;
an introduction-side merge part at which each of the plurality of upstream-side exhaust gas introduction lines merge; and
a single downstream-side exhaust gas introduction line connecting the introduction-side merge part and the at least one spray drying device, and
wherein the number of spray drying devices is smaller than the number of the plurality of exhaust gas ducts,
wherein the spray drying system further comprises:
a first flow-rate adjusting part disposed in the downstream-side exhaust gas introduction line, the first flow-rate adjusting part being capable of adjusting a flow rate of the exhaust gas flowing in the downstream-side exhaust gas introduction line;
an exhaust gas discharge line connecting the spray drying device and the plurality of exhaust gas ducts;
a temperature detection unit disposed in a bottom part of the spray drying device or the exhaust gas discharge line, the temperature detection unit being configured to detect a temperature in the bottom part of the spray drying device or the exhaust gas discharge line; and
a control device configured to control the first flow-rate adjusting part so that a temperature detected by the temperature detection unit is not lower than an evaporation temperature of the wastewater.

10. A spray drying system for drying wastewater to be dried, the spray drying system comprising:
an exhaust gas introduction line for introducing an exhaust gas discharged from an exhaust gas generation source, the exhaust gas introduction line being connected to a fuel gas duct including a plurality of exhaust gas ducts for allowing the exhaust gas to flow through; and
at least one spray drying device connected to the exhaust gas introduction line and configured to bring the exhaust gas introduced from the exhaust gas introduction line into contact with the wastewater,
wherein the number of spray drying devices is smaller than the number of the plurality of exhaust gas ducts,
wherein the spray drying system further comprises an exhaust gas discharge line connecting the spray drying device and each of the plurality of exhaust gas ducts, and
wherein the exhaust gas discharge line includes:
a single upstream-side exhaust gas discharge line connected to the spray drying device;
a plurality of downstream-side exhaust gas discharge lines, wherein a downstream-side exhaust gas discharge line among the plurality of downstream-side exhaust gas discharge lines is connected to each of the plurality of exhaust gas ducts; and
a discharge-side branch part branched into each of the plurality of downstream-side exhaust gas discharge lines from the single upstream-side exhaust gas discharge line.

* * * * *